US007306697B2

(12) United States Patent
Kikushima et al.

(10) Patent No.: US 7,306,697 B2
(45) Date of Patent: Dec. 11, 2007

(54) USED PAPER DIAPER PROCESSING METHOD AND USED PAPER DIAPER PROCESSING DEVICE

(75) Inventors: Chiyuki Kikushima, Tokyo (JP); Tadashi Komoto, Kiryu (JP)

(73) Assignee: Nippon Asahi Kiko Hanbai Co., Ltd., Tokyo (JP)

( * ) Notice: Subject to any disclaimer, the term of this patent is extended or adjusted under 35 U.S.C. 154(b) by 480 days.

(21) Appl. No.: 10/483,229

(22) PCT Filed: Jul. 9, 2002

(86) PCT No.: PCT/JP02/06949

§ 371 (c)(1),
(2), (4) Date: Jun. 4, 2004

(87) PCT Pub. No.: WO03/006187

PCT Pub. Date: Jan. 23, 2003

(65) Prior Publication Data

US 2004/0209753 A1  Oct. 21, 2004

(30) Foreign Application Priority Data

Jul. 9, 2001   (JP) ............................. 2001-207409
Dec. 28, 2001  (JP) ............................. 2001-399613

(51) Int. Cl.
*D21B 1/12* (2006.01)
*B02C 23/18* (2006.01)

(52) U.S. Cl. .............................. 162/4; 162/5; 210/768; 210/770; 210/774; 210/806; 241/15; 241/20

(58) Field of Classification Search ................ 162/4–9; 210/634, 639, 767–770, 772–774, 805, 806; 241/14–21, 24.19, 24.29

See application file for complete search history.

(56) References Cited

U.S. PATENT DOCUMENTS

| 5,292,075 A | * | 3/1994 | Bartlett ........................ 241/20 |
| 5,322,225 A | * | 6/1994 | Cina ............................ 241/14 |
| 5,618,003 A | * | 4/1997 | Akiyoshi et al. ............. 241/19 |

FOREIGN PATENT DOCUMENTS

| JP | 2000-84533   | 3/2000 |
| JP | 2000-246011  | 9/2000 |
| JP | 2001-47023   | 2/2001 |
| JP | 2001-104929  | 4/2001 |
| WO | 94/20668     | 9/1994 |

* cited by examiner

*Primary Examiner*—Joseph Drodge
(74) *Attorney, Agent, or Firm*—Wenderoth, Lind & Ponack, L.L.P.

(57) ABSTRACT

The present invention provides a used paper diaper processing method comprising: a swell suppressing step for immersing a used paper diaper in a swell suppressant solution to suppress the swelling of the polymer with high water absorbability; a breakup step for breaking up the paper diaper subsequent to the swell suppressing step while stirring the same immersed in a processing liquid, into a cover material breakup substance and an absorbing material breakup substance; a cover material breakup substance removing step for removing the cover material breakup substance; a filtering step for filtering the processing liquid containing the absorbing material breakup substance and excreta to separate and remove the absorbing material breakup substance; and a liquid discharging step for discharging the processing liquid containing excreta into a sewage treatment facility; and an absorbing material breakup substance recovering step for recovering the absorbing material breakup substance separated and removed by the filtering step.

11 Claims, 12 Drawing Sheets

(a)

(b)

USED PAPER DIAPER PROCESSING METHOD AND USED PAPER DIAPER PROCESSING DEVICE

TECHNICAL FIELD

The present invention relates to a processing method and processing equipment for breaking up, disinfecting and deodorizing a used paper diaper, used, for example, in a hospital or a care house of the aged, along with separating and recovering components of a paper diaper.

BACKGROUND ART

In general, a paper diaper is composed of cover materials consisting of a water-impermeable sheet mainly for preventing excreta leakage and a water permeable non-woven fabric with good skin touch feeling, containing between them absorbing materials consisting of a fiber material such as cotton-like pulp and fibrous cellulose, and a polymer with high water absorbability such as absorbing paper and polymer absorbing material. When in use, the water permeable non-woven fabric sheet allows water to permeate instantaneously, and the absorbing material absorbs the water to prevent backflow of the water, while the water-impermeable sheet prevents outward leakage of excreta or the water. In this connection, a paper diaper has a merit of no risk of leakage of the water once absorbed due to high swelling by water absorption, but at the same time, it has also a demerit in that it can not be reused by removing excreta differing from a cloth diaper. Thus, a used paper diaper is presently disposed by incineration or in a land fill, which causes various problems in view of environmental preservation, transportation and treatment cost.

With a recent increase in population of the aged, annual demand of a diaper for nursing has increased to about 2.4 billion pieces and is estimated to further increase rapidly in the future. A paper diaper occupies about 97% of the domestic market for adult diapers, and it is foreseen that an environmental problem will become more and more serious in view of waste treatment methods for a used paper diaper in metropolitan areas.

In view of the above situation, various paper diaper processing methods have been proposed. For example, in JP-A-2000-84533, a method is proposed comprising cutting up a used paper diaper by a crusher, followed by breaking up and separating the diaper into components, decomposing a water absorbing polymer to monomers in a decomposing tank charged with calcium chloride to make the monomers water soluble and separating and recovering a pulp component. JP-A-6-502454 (JP No. 3222462) also proposes a method for separating a paper diaper into component elements by finely crushing with a tooth-like blade or the like.

However, these conventional processing methods and processing equipment for a used paper diaper cannot remove excreta sufficiently, because, in all of them, a used paper diaper is broken up compulsorily by a mechanical cutting force using a blade and the like together with excreta, and components of a paper diaper are recovered with simultaneous or subsequent washing. Thus, a large quantity of excreta is left in the components recovered, posing problems such as malodor and hygiene as well as difficulty in processing after that. In addition, since a mechanical cutting force is given during breaking up a paper diaper by a blade and the like, a cover material is also cut. The finely cut cover material is easily commingled into an absorbing material recovered, and it is also difficult to remove it. Therefore, there was a problem that washing and removal of excreta from breakup components of the paper diaper was difficult.

In more detail, excreta and components of a paper diaper such as a broken up cover material and an absorbing material are dispersed in a floating state in a processing liquid in an early stage of a breakup step, but with progress of the step, the absorbing material gradually precipitates and deposits at the bottom part with excreta commingled among them. Once precipitated and deposited, each component never floats or returns to a dispersed state in water again even by intensive washing afterward. In particular, a precipitated fiber material keeps a deposited state, and does not loosen even by newly charging water and immersing after discharging excreta-containing water. Therefore, excreta commingled and precipitated among each component cannot be removed even by repeated washing, resulting in a large quantity of excreta left in components recovered.

In a conventional used paper diaper processing equipment using a rotating drum for breaking up a paper diaper, a broken up absorbing material and the like may clog between the rotating drum and its outer barrel, resulting in troublesome maintenance work in removal of clogged absorbing material. Furthermore, a polymer with high water absorbability highly swells by absorbing water in processing of a used paper diaper, resulting in an increased volume of a used paper diaper charged. Due to this volume change, a size of equipment becomes large in spite of small processing capacity, which also poses a problem in that a wider installation space is needed.

However, it is difficult for a hospital or a care house for the aged, who wishes to install this kind of equipment, to secure wide floor space. Thus, the conventional used paper diaper processing equipment was substantially difficult to be installed.

The present invention has been made in view of such circumstances, and is directed to solve conventional technical problems and provide a method for suppressing the volume increase in processing a used paper diaper. Further, the present invention is also directed to provide a used paper diaper processing method enabling to independently break up a cover material and an inner absorbing material in breaking up a used paper diaper, resulting in enhanced washing efficiency of broken up components and less excreta remaining among an absorbing material.

Further, the present invention is also directed to provide used paper diaper processing equipment enabling efficient separation of a cover material, an absorbing material and excreta, easy removal of cake adhered to a filtering material and the like, resulting in less clogging, easy maintenance, high processing ability and relatively compact sizing.

SUMMARY OF THE INVENTION

The present invention has been proposed to attain the above-described objects. As the first aspect of the invention, the present invention provides a used paper diaper processing method for breaking up a used paper diaper composed of at least cover materials consisting of a water-impermeable sheet and a water permeable non-woven fabric, and absorbing materials containing a fiber material and a polymer with high water absorbability, wherein said method comprises:

a swell suppressing step for immersing a used paper diaper in a swell suppressant solution to suppress the swelling of the polymer with high water absorbability;

a breakup step for breaking up the paper diaper subsequent to the swell suppressing step while stirring the same immersed in a processing liquid, into a cover material breakup substance and an absorbing material breakup substance;

a cover material breakup substance removing step for removing the cover material breakup substance;

a filtering step for filtering the processing liquid containing the absorbing material breakup substance and excreta to separate and remove the absorbing material breakup substance;

a liquid discharging step for discharging the processing liquid containing excreta into a sewage treatment facility; and an absorbing material breakup substance recovering step for recovering the absorbing material breakup substance separated and removed by the filtering step.

As the second aspect of the invention, the present invention provides an embodiment of the above-described used paper diaper processing method, wherein the swell suppressant used in the swell suppressing step is at least one kind of water soluble substance selected from a group consisting of alkali earth metal salts, polyvalent metal salts and metal hydroxides. Further, as the third aspect of the invention, the present invention provides an embodiment of the used paper diaper processing method, wherein the processing liquid used in the breakup step is a heated processing liquid heated at a temperature not lower than 80° C. As the fourth aspect of the invention, the present invention provides an embodiment of the above-described used paper diaper processing method, wherein the processing liquid contains at least one kind of chemical agent selected from a group consisting of disinfectant, deodorant, odor adsorbing agent, anti-odor agent, germicide, antimicrobial agent and perfuming agent.

As the fifth aspect of the invention, the present invention provides an embodiment of the above-described used paper diaper processing method further comprising, subsequent to the absorbing material breakup substance recovering step and prior to the filtering step, a liquid level adjusting step for discharging a part of the liquid in advance from the processing liquid containing the absorbing material breakup substance and excreta, while leaving the processing liquid in such amount as to enable the absorbing material breakup substance to be floated. Furthermore, as the sixth aspect of the invention, an embodiment of the above-described used paper diaper processing method further comprises, subsequent to the absorbing material breakup substance recovering step and prior to the filtering step, a liquid level adjusting step for discharging a part of the liquid in advance from the processing liquid containing the absorbing material breakup substance and excreta, while leaving 20-30% of the processing liquid.

The present invention further provides, as the seventh aspect of the invention, the used paper diaper processing method further comprising, subsequent to the liquid discharging step, a cover material washing step for washing the cover material breakup substance removed by feeding the processing liquid again. As the eighth aspect of the invention, the used paper diaper processing method further comprises, subsequent to the liquid discharging step, an absorbing material breakup substance washing step for washing the absorbing material breakup substance removed by feeding the processing liquid again. As the ninth aspect of the invention, the used paper diaper processing method further comprises, in the absorbing material breakup substance recovering step, a compression step for compressing the absorbing material breakup substance remained in the filtering step. As the tenth aspect of the invention, the used paper diaper processing method further comprises, subsequent to the liquid discharging step, a dewatering step for dewatering the cover material breakup substance removed.

Furthermore, the present invention provides, as the eleventh aspect of the invention, a used paper diaper processing equipment for breaking up a used paper diaper composed of at least a cover material consisting of a water-impermeable sheet and a water permeable non-woven fabric, and an absorbing material containing a fiber material and a polymer with water absorbability, wherein the equipment comprises at least:

a rotating drum having a plurality of through holes on a circumferential wall;

a plurality of protrusions provided on an inner circumferential surface of the rotating drum;

an outer barrel for installing therein the rotating drum with a specified clearance apart from the rotating drum; a processing liquid supplying means for supplying a processing liquid into the outer barrel;

a heating means for heating the processing liquid, a filtering and separating mechanism provided at the downstream side of the outer barrel for filtering an absorbing material breakup substance and discharging the processing liquid containing excreta into a sewage treatment facility; and a liquid discharging means for discharging a content in the outer barrel into the filtering and separating mechanism. Furthermore, the present invention provides, as the twelfth aspect of the invention, the above-described used paper diaper processing equipment, wherein the through hole of the rotating drum has an aperture diameter of 4-15 mm. The thirteenth aspect of the invention, includes the above-described used paper diaper processing equipment, wherein the filtering and separating mechanism has a filtering material for filtering and separating the absorbing material breakup substance and discharging the processing liquid containing excreta into a sewage treatment facility, and a compression mechanism for compressing the absorbing material breakup substance filtered and separated.

Furthermore, the present invention provides, as the fourteenth aspect of the invention, the above-described used paper diaper processing equipment, wherein the equipment further comprises, between the liquid discharging means and the filtering and separating mechanism, a transporting means, for transporting the processing liquid containing the absorbing material breakup substance and excreta discharged from the outer barrel.

The present invention further provides, as the fifteenth aspect of the invention, the above-described used paper diaper processing equipment, wherein the equipment further comprises, at the lower part of the outer barrel, a filtering and liquid discharging means for filtering and removing the absorbing material breakup substance in the outer barrel with a filtering material and discharging the processing liquid containing excreta into a sewage treatment facility, wherein the filtering and liquid discharging means has a liquid discharging port located at a position where a part of the processing liquid can be discharged from inside of the outer barrel into a sewage treatment facility, while leaving such an amount of the processing liquid that the absorbing material breakup substance in the outer barrel can be floated.

Furthermore, the present invention provides, as the sixteenth aspect of the invention, the above-described used paper diaper processing equipment, wherein the equipment further comprises, at a higher position than a level of the filtering material of the filtering and liquid discharging means, an overflow liquid discharging means for filtering and removing the absorbing material breakup substance in the outer barrel with the filtering material and overflowing the excessive processing liquid.

The present invention further provides, as the seventeenth aspect of the invention, the used paper diaper processing equipment, wherein the equipment has, at an outer surface of the rotating drum, stirring protrusions for stirring the processing liquid remaining in the lower part than the liquid discharging port and making the absorbing material breakup substance remaining in the outer barrel floated in the processing liquid.

Furthermore, the present invention provides, as the eighteenth aspect of the invention, anyone of the above-described used paper diaper processing equipment, wherein each of the stirring protrusion(s) has a cake removing means for removing cake adhered to the filtering material in the filtering and liquid discharging means and/or the filtering material in the overflow liquid discharging means, respectively.

The present invention further provides, as the nineteenth aspect of the invention, an embodiment of the above-described used paper diaper processing equipment, wherein the filtering and liquid discharging means has a filtering material forward/backward driving means for converting the filtering material in a state contacting or not contacting with the cake removing means. The twentieth aspect of the invention includes, an embodiment of the above-described used paper diaper processing equipment, wherein the overflow liquid discharging means has a filtering material forward/backward driving means for converting the filtering material in a state contacting or not contacting with the cake removing means.

Figure 1:
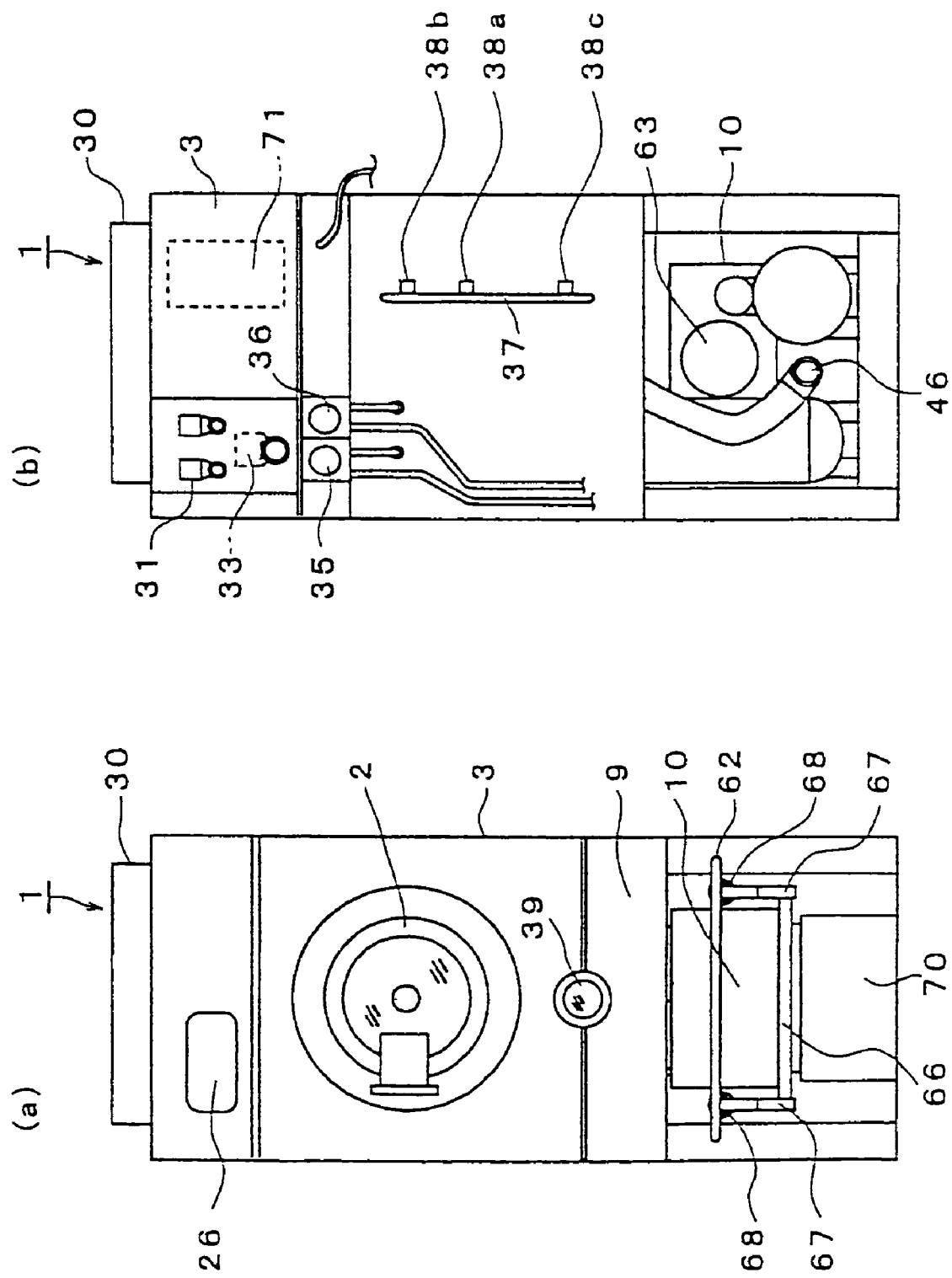
FIG. 1 shows external appearance of the used paper diaper processing equipment in Examples, and (a) is a front view and (b) is a rear view thereof.

In the drawings, each number means as follows:

1 paper diaper processing equipment
2 opening-closing door
2' window
3 housing
4 support frame
5 shock absorbing material
6 outer barrel
7 rotating drum
9 receiving tank
10 filtering and separating mechanism
11 first discharging valve
12 second discharging valve
13 motor
14 discharging means
15 through hole
16 stirring protrusion
17 stirring protrusion
19 processing liquid feeding means
20 shaft
21 bearing
22 pulley
23 pulley
24 belt
25 electric heater
26 operation panel
30 reservoir tank
31 reserved water feed valve
33 processing liquid feed valve
34 electric heater
35 swelling suppressant feed pump
36 chemical agents charging pump
37 communicating tube
38 processing liquid level detecting means
39 observation window
40 upright plane
41 bottom plane
42 first discharging port
43 valve body
44 first box section
45 first cylinder
46 main drain pipe
461 first branch pipe
461a upper stream end
462 second branch pipe
462a upper stream end
463 first branch pipe
464 second branch pipe
464a upper stream end
47 filtering material
48 scraper
50 second discharging port
51 valve body
52 second box section
53 second discharging cylinder
54 connecting pipe
55 scraper cylinder
60 filtering material
61 shaft 62 opening-closing lid
63 compression cylinder
64 compression plate
65 lid opening-closing cylinder
66 lock pin
67 hook
68 cylinder for locking
69 discharged liquid box
70 cake recovering container
71 control equipment
110 filtering and discharging means
101 separation tank
111 filtering material
112 forward/backward driving means
113 opening-closing valve
114 forward/backward driving means
115 brush
116 spraying means
120 overflow liquid discharging means
121 filtering material
123 frame
124 forward/backward driving means
125 brush
126 spraying means
130 discharging means
131 opening-closing door
132 opening section
133 chute wall
134 pivoting shaft
134a shorter part
135 forward/backward driving means
136 guiding member
140 filtering and discharging means
141 filtering material
142 forward/backward driving means
143 opening-closing valve
144 forward/backward driving means
145 brush
146 spraying means
150 filtering and separating mechanism
151 continuous transporting means
152 screw conveyer
153 motor
154 discharging pipe
160 discharging means
161 opening section
162 opening-closing door
163 pivoting shaft
164 wire-like member
165 winding means
166 pulley
167 pulley

DETAILED DESCRIPTION OF PREFERRED EMBODIMENTS

The present invention will be explained more in detail below.

(I) Used Paper Diaper Processing Method

The present invention first relates to a used paper diaper processing method. A paper diaper is composed of, as described above, cover materials consisting of a water-impermeable sheet mainly for preventing excreta leakage and a water permeable non-woven fabric with good skin touch feeling, containing between them absorbing materials consisting of a fiber material such as cotton-like pulp and fibrous cellulose, and a polymer with high water absorbability such as absorbing paper and polymer absorbing material. A used paper diaper processing method of the present invention enables to solve problems of malodor or hygiene and reduce an amount of waste, while preventing swelling of the paper diaper during processing, by removing excreta and separating cover materials and an absorbing material.

Specifically, a used paper diaper processing method of the present invention comprises at least the following steps:

(a) a swell suppressing step for immersing a used paper diaper in a swell suppressant solution to suppress swelling of a polymer with high water absorbability;

(b) a breakup step for breaking up the paper diaper subsequent to the swell suppressing step while stirring the same immersed in a processing liquid, into a cover material breakup substance and an absorbing material breakup substance;

(c) a cover material breakup substance removing step for removing the cover material breakup substance;

(d) a filtering step for filtering the processing liquid containing the absorbing material breakup substance and excreta to separate and remove the absorbing material breakup substance;

(e) a liquid discharging step for discharging the processing liquid containing excreta into a sewage treatment facility; and (f) an absorbing material breakup substance recovering step for recovering the absorbing material breakup substance separated and removed by the filtering step.

In this processing method, an immersing method for a used paper diaper in the swell suppressing step (a) is not particularly limited. For example, a used paper diaper may be charged in a tank containing a swell suppressant solution. Since a used paper diaper is stirred and broken up in the next breakup step (b), it is preferable that the swell suppressing step is carried out, for example, in a tank or a rotating drum having a stirring blade.

Swell suppressant used in the swell suppressing step (a) is not particularly limited, as long as it can suppress swelling of the polymer with high water absorbability used as an absorbing material of paper diaper. That is, that the swell suppressant does not or hardly facilitates swelling of the above polymer, including a crosslinked acrylate salt polymer, a crosslinked isobutylene-maleate salt copolymer, a crosslinked acrylate ester-vinyl acetate saponified copolymer, a starch-acrylate salt graft copolymer and a vinyl polymer with a side chain of carboxyl group. The type of swell suppressant is not particularly limited, but it is preferably at least one kind of water-soluble substance selected from a group consisting of alkali earth metal salts, polyvalent metal salts and metal hydroxides. Concentration of the aqueous swell suppressant solution is not particularly limited, but is 0.1-20% by weight, preferably 0.2-10% by weight and more preferably 0.3-3% by weight. The aqueous swell suppressant solution may be, naturally, an aqueous solution dissolving a swell suppressant alone or may be a processing liquid used in the next breakup step (b) containing and dissolving a swell suppressant.

In the next breakup step (b), a used paper diaper is broken up into a cover material breakup substance and an absorbing material breakup substance by stirring a used paper diaper in a processing liquid while swelling being suppressed. In this step, a paper diaper is broken up by an impact, for example, caused by a pulling force of another paper diaper, contacting with the tank wall and stirring blades or contacting with each other. Further, when stirring is performed in a rotating drum having a stirring blade and the like, a paper diaper is also broken up by an impact of falling down after once hung up high by the stirring blade. In particular, use of a hot processing liquid by heating at a temperature not lower than 80° C. is preferable, because a heat-sealed part of a front cover sheet of the paper diaper can be softened and delaminated by heat, resulting in easier breakup of an inner absorbing material. Therefore, continued stirring in a certain period in a hot processing liquid can break up a water-impermeable sheet and non-woven fabric of a paper diaper, thereby an absorbing material consisting of a fiber material or a polymer with high water absorbability enclosed by these sheets can be broken up in pieces. It is also preferable to use a hot processing liquid, because the paper diaper is simultaneously thermally sterilized sufficiently without adding a high concentration of disinfectant and the like in the processing liquid. In particular, heating at a temperature of up to 85° C. is more preferable, because disinfection or sterilization can be ensured and malodor is removed at the same time, as well as complete breakup of the whole paper diaper.

Further, processing liquid used in the breakup step (b) is not particularly limited in composition thereof and the like as long as it is an aqueous solution. When a used paper diaper is broken up in a processing liquid, excreta and the like is also dispersed in the processing liquid, but it is known that odor of excreta or urine can be removed by sufficient washing with water (for example, see "Review of the latest odor prevention and deodorization technology", supervised by Tatsukichi Ishiguro, published by N.T.S., 1997). Also, addition of a special additive is not necessary because, as described above, disinfection is possible by using a hot processing liquid. It is also possible to enhance an effect of deodorization or disinfection by using a processing liquid containing at least one kind of agent selected from a group consisting of disinfectant, deodorant, odor adsorbing agent, anti-odor agent, germicide, antimicrobial agent and perfuming agent, but the addition is not necessarily required.

When disinfectant is used, chemical agents enabling oxidative decomposition of excreta include, for example, hypochlorite salts such as sodium hypochlorite and potassium hypochlorite; bleaching powder, hydrogen peroxide, potassium permanganate, manganese dioxide, iron compounds, sodium percarbonate, ozone, organic peroxides, chlorine dioxide, chlorite salts, persulfate salts and periodate salts. Among them, sodium hypochlorite, bleaching powder, perchlorate salts, persulfate salts and periodate salts are preferable. In this connection, sodium hypochlorite is particularly preferable because it exerts as a disinfectant and a deodorant in addition to high water solubility thereof. Further, combined use of sodium hypochlorite with an acid such as acetic acid is also more preferable because of enhanced oxidative strength in acidic condition. The concentration of disinfectant is 0.01-500 ppm, preferably 0.05-300 ppm, and more preferably 0.1-200 ppm in an aqueous solution after disinfecting treatment.

Further, as a deodorant, any compound may be used as long as it can decompose at least one kind of odor component of excreta, that is, hydrogen sulfide, methyl mercaptane, methyl sulfide and ammonia, specifically including oxidizing agents such as hypochlorite salts such as sodium hypochlorite and potassium hypochlorite; bleaching powder, hydrogen peroxide, potassium permanganate, manganese dioxide, sodium percarbonate, ozone, organic peroxides, chlorine dioxide, chlorite salts, perchlorate salts, persulfate salts and periodate salts, iron (II) compounds, titanium oxide, zirconium oxide, silicon dioxide, calcium oxide, aluminium oxide, alum, aluminium sulfate, copper sulfate, zinc carbonate, zinc sulfate, zinc chloride; metal compounds of nickel, cobalt, platinum, palladium, silver, molybdenum, ruthenium and the like; organic aldehyde compounds and iron (III) phthalocyanine derivatives. Among them, as described above, sodium hypochlorite is preferable because it exerts as a disinfectant and has high water solubility. Concentration of deodorant is 0.01-500 ppm, preferably 0.05-300 ppm and more preferably 0.1-200 ppm in an aqueous solution after deodorization treatment.

Next, in a cover material breakup substance removing step (c), a cover material breakup substance among the components of a paper diaper broken up in the previous breakup step (b) is removed. Here, the removing method is not particularly limited and the cover material breakup substance may be scooped by a coarse net and the like or the processing liquid containing cover material breakup substance, absorbing material breakup substance and excreta may be filtered by a mesh-basket-like tool.

The broken up paper diaper is separated, as described above, into a cover material breakup substance consisting of a water-impermeable cover sheet and a water permeable non-woven fabric, and an absorbing material consisting of a fiber material or a polymer with high water absorbability enclosed therein. In this case, the absorbing material breakup substance is dispersed in a processing liquid as a substance with small particle size, because the fiber material in the absorbing material is contained as a fine fiber and the polymer with high water absorbability is in a particle or powder form. On the other hand, the cover material floats in a processing liquid in a state of a large sized sheet or a little fragmented sheet.

Therefore, by using a coarse net or a punched mesh-like container, an absorbing material breakup substance, together with excreta and processing liquid, passes through fine pores, while a cover material breakup substance remains and removed in the container without passing through the fine pores. Here, the pore diameter of net or mesh-basket used is desirably 4-15 mm. A pore diameter smaller than 4 mm makes passing of the absorbing material breakup substance or excreta difficult, while a pore diameter larger than 15 mm is unsuitable because the cover material breakup substance passes through.

Further, in the cover material breakup substance removing step (c), a removed cover material breakup substance may be washed by a processing liquid or water or dewatered before transferring to the next filtering step or after completion of all steps.

In filtering step (d), processing liquid in which the cover material breakup substance was removed in the cover material breakup substance removing step (c), that is, a processing liquid containing an absorbing material breakup substance and excreta is filtered to separate and remove an absorbing material breakup substance. Filtering material used in this filtering is not particularly limited as long as it can separate and remove an absorbing material breakup substance from processing liquid and discharge excreta. For example, a filtering material of fine net-like, felt like or sheet like and further a filtering material made of plastic or metal may be considered, and among these various types, suitable material may be selected by taking into consideration durability to processing liquid, easiness in handling, cost and the like.

Further, since the processing liquid after filtering and separating absorbing material breakup substance by the filtering step (d) mainly contains excreta, in liquid discharging step (e), this processing liquid is discharged into a sewage treatment facility. Here, a step for a processing such as neutralization, sterilization and the like of the processing liquid may be included before discharging into the sewage treatment facility based on waste water standard determined by municipality and the like.

Then the absorbing material breakup substance left on a filtering material in the above-described filtering step (d) is recovered in an absorbing material breakup substance recovering step (f). Here, absorbing material breakup substance may be washed and/or dewatered or compressed to reduce the volume.

A used paper diaper processing method of the present invention comprises the steps from (a) to (f) as described above; however, the method may further comprise various other steps, if necessary.

Specifically, when the volume of processing liquid after the cover material breakup substance removing step (c) is too much, considering the capacity of the tank and the like, the method may further comprise, prior to the filtering step, a liquid level adjusting step for discharging a part of the liquid in advance from the processing liquid containing the absorbing material breakup substance and excreta, while leaving the processing liquid in such amount so as to enable the absorbing material breakup substance to remain floating. According to the study by the present inventors, it is preferable in such liquid level adjusting step to discharge a part of the liquid from the processing liquid containing the absorbing material breakup substance and excreta, while leaving 20-30% of the processing liquid. By using this means, the absorbing material can be prevented from depositing and becoming impossible to be dispersed.

Alternatively, the method may further comprise, subsequent to the discharging step (e) or the like, a cover material breakup substance washing step for washing the cover material breakup substance removed in the cover material breakup substance removing step (c) with the processing liquid again. By this means, excreta can be removed completely. By further addition of a dewatering step, the processing liquid can be removed from a cover material breakup substance, and the cover material breakup substance becomes possible to be disposed as general waste. Further, as described above, use of a hot processing liquid is more preferable because it simultaneously enables thermal sterilization of the cover material breakup substance.

The method may further comprise, subsequent to the liquid discharging step (e), an absorbing material breakup substance washing step for washing the absorbing material breakup substance by feeding the processing liquid again. This method can further remove excreta from the absorbing material breakup substance, and is more preferable in view of disposing the cover material breakup substance as general waste.

The method may further comprise, in the absorbing material breakup substance recovering step (f), a compression step for compressing the absorbing material breakup substance that remains from the filtering step. The addition of this step is preferable, because dewatering and volume reduction of the absorbing material breakup substance recovered can be attained simultaneously.

The used paper diaper processing method of the present invention may, naturally, further comprise other various kinds of steps such as those for concentrating, washing and regenerating of a filtering material and chemical treatment of discharged liquid.

(II) Used Paper Diaper Processing Equipment

The present invention relates secondly to a used paper diaper processing equipment.

Used paper diaper processing equipment of the present invention is, as described above, equipment for breaking up a used paper diaper composed of at least cover materials consisting of a water-impermeable sheet and a water permeable non-woven fabric and absorbing materials containing a fiber material and a polymer with high water absorbability. Specifically, the equipment comprises at least:

(1) a rotating drum having a plurality of through holes on a circumferential wall;

(2) a plurality of protrusions provided on an inner circumferential surface of the rotating drum;

(3) an outer barrel for containing therein the rotating drum with a specified clearance apart from the rotating drum;

(4) a processing liquid supplying means for supplying a processing liquid into the outer barrel;

(5) a heating means for heating the processing liquid;

(6) a filtering and separating mechanism provided at the downstream side of the outer barrel for filtering an absorbing material breakup substance and discharging the processing liquid containing excreta into a sewage treatment facility; and (7) a liquid discharging means for discharging contents in the outer barrel into the filtering and separating mechanism.

In a used paper diaper processing equipment of the present invention, a rotating drum is particularly preferable in view of continuous operation of the swelling suppression step (a), the breakup step (b) and the cover material breakup substance removing step (c) in the above-described used paper diaper processing method. That is, the rotating drum has many through holes on a circumferential wall and protrusions on an inner circumferential surface, and is contained in an outer barrel installed with a specified clearance, and thus a used paper diaper can be immersed in a swelling suppressant solution, stirred in a processing liquid and broken up by charging a used paper diaper in this rotating drum, followed by charging an aqueous solution of swelling suppressant or a processing liquid into the outer barrel via processing liquid feeding means and rotating the rotating drum. Further, as the processing liquid containing a finely dispersed absorbing material breakup substance and excreta is discharged via many through holes, only a cover material breakup substance is left in the rotating drum, and thus the cover material breakup substance can be removed from the processing liquid.

The rotating drum is not particularly limited in shape, material, size and the like thereof as long as it has a plurality of through holes and protrusions on a circumferential wall. For example, it can be formed by a horizontally laid cylinder made of stainless steel or rigid plastic and the like, with a bottom and a circular charging port at the front surface. Protrusions are for stirring a paper diaper and can be formed, for example, along an axis direction of the rotating drum, and arranged at a plurality of places, for example, at 3-6 places, at an equal angle along the inner circumferential direction of the rotating drum. Furthermore, the protrusions are not particularly limited in a composition of angle and shape thereof, as long as they can stir a paper diaper, and their shape includes, for example, a hat with half elliptical cross-section, a plate-like stirring blade, a paddle and a bar. Since tearing to too small fragments is not preferable for efficient removal of cover material breakup substance, the protrusions are desirably composed of obtuse angle or curvature rather than acute angle.

Further, a through hole in the rotating drum preferably has an aperture diameter of 4-15 mm. This range was determined from the results of a practical experiment using a paper diaper. According to the results of the experiment, with a diameter less than 4 mm, excreta separated from a paper diaper became difficult to pass through and remains in the rotating drum, while with a diameter over 15 mm, a cover material breakup substance, which should be separated and recovered, passed through holes 13. An optimal aperture diameter of the through hole was found to be about 6-8 mm by the experiment.

The processing liquid fed to an outer barrel is not particularly limited as long as it is an aqueous solution, and an aqueous solution of a swelling suppressant, containing alkali earth metal salts, polyvalent metal salts, metal hydroxides and the like, in a range of 0.1-20% by weight, preferably 0.2-10% by weight and more preferably 0.3-3% by weight, may be used as it is. The aqueous solution may further contain at least one kind of chemical agent selected from a group consisting of disinfectant, deodorant, odor adsorbing agent, anti-odor agent, germicide, antimicrobial agent and perfuming agent without any limitation in composition. For example, an aqueous solution containing a disinfectant and deodorant of sodium hypochlorite or the like in a range of 0.01-500 ppm, more preferably 0.05-300 ppm and further preferably 0.1-200 ppm in the aqueous solution after disinfection and deodorization processing. Naturally, a solution that does not contain these disinfectants or deodorants may be used.

The processing liquid supplied to an outer barrel is also supplied to the rotating drum via through holes of the rotating drum. Here, the processing liquid supplying means may be a means to supply to an outer barrel a processing liquid containing the above-described various chemical agents in advance, or a means to supply to an outer barrel water, chemical agent, swell suppressant and the like separately in appropriate compositions, or a means separately comprising a means to supply a prepared processing liquid and a means to supply a swelling suppressant by combining the above means.

Furthermore, in the used paper diaper processing equipment of the present invention, as described above, by heating a processing liquid by a processing liquid heating means, the heat-sealed part of a front cover sheet of the paper diaper is softened in a hot processing liquid, thereby inner absorbing materials easily go out and efficient breakup of a used paper diaper is performed. Also, by using a hot processing liquid, a used paper diaper is sterilized by heat. Examples of such heating means include an electric heater of waterproof type and a circulation flow passage of hot water or steam. The heating temperature by the heating means is suitably set at 80-100° C. Further, the heating means may be installed at any place as long as it can heat the processing liquid, including a processing liquid supplying means, an outer barrel and any other places where a processing liquid is introduced, and may be installed at two or more places.

The used paper diaper processing equipment of the present invention further comprises a filtering and separating mechanism for filtering the absorbing material breakup substance and discharging a processing liquid containing excreta into a sewage treatment facility. Such filtering and separating mechanism can perform the above-described filtering step (d), in which the processing liquid containing an absorbing material breakup substance and excreta is filtered to separate and remove an absorbing material breakup substance. The structure of such filtering and separating mechanism is not particularly limited, but preferably has a filtering material for filtering and separating an absorbing material breakup substance and discharging processing liquid containing excreta into a sewage treatment facility.

Further, the filtering and separating mechanism preferably has a compression mechanism for compressing an absorbing material breakup substance filtered and separated in order to perform an absorbing material breakup substance recovering step (f) for recovering an absorbing material breakup substance which is separated and removed by the filtering step. The compressed cake of absorbing material breakup substance may be taken out manually by an operator, or may be recovered by dropping the cake into a recovering container by a compression cylinder and the like, by installing an opening and closing lid and a recovering container.

Further, the used paper diaper processing equipment of the present invention comprises a liquid discharging step for discharging contents of an outer barrel to the filtering and separating mechanism, by which the liquid discharging step (e) for discharging a processing liquid containing excreta into a sewage treatment facility side, can be performed.

The used paper diaper processing equipment of the present invention comprises the above-described components, and preferably further comprises a transporting means between the liquid discharging means and the filtering and separating mechanism, for transporting processing liquid containing an absorbing material breakup substance and excreta discharged from an outer barrel, a filtering and discharging means at the lower part of the outer barrel for filtering with a filtering material and removing an absorbing material breakup substance in said outer barrel, and discharging a processing liquid containing excreta into a sewage treatment facility, and an overflow liquid discharging means for filtering and removing an absorbing material breakup substance in the outer barrel with a filtering material, and overflowing excessive processing liquid.

These transporting means, filtering and liquid discharging means and overflow liquid discharging means preferably have sufficiently large upper surface apertures and sufficient volumes or discharging capacities so that they can efficiently and quickly separate insoluble components of a broken up paper diaper, and prevent the insoluble components from entering into a clearance between the rotating drum and the outer barrel to avoid them exerting a resistance on the rotating drum. Such design can avoid troubles such that the rotating drum has stopped rotating through all of charged paper diaper, when broken in pieces, can not be contained and overflowed substance clogs between the rotating drum and the outer barrel.

Further, the used paper diaper processing equipment of the present invention preferably has, at an outer surface of the rotating drum, stirring protrusions for stirring the processing liquid remaining in the lower part than the liquid discharging port and making the absorbing material breakup substance remaining in the outer barrel floated in the processing liquid. These stirring protrusions preferably have a cake removing means for separately removing cake adhered to the filtering materials in the filtering and liquid discharging means and the overflow liquid discharging means. Examples of the cake removing means are a scraper, brush and the like. Further, it is preferable that the filtering material or the cake removing means can move forward/backward so that the cake removing means can contact with the filtering material surface only when cake is removed from the filtering material.

A used paper diaper processing method and configurations and working mechanisms of a processing equipment of the present invention will be explained in more detail using the Examples and attached drawings.

EXAMPLES

Example 1

Used Paper Diaper Processing Equipment I

[Configuration of Equipment]

Figure 2:
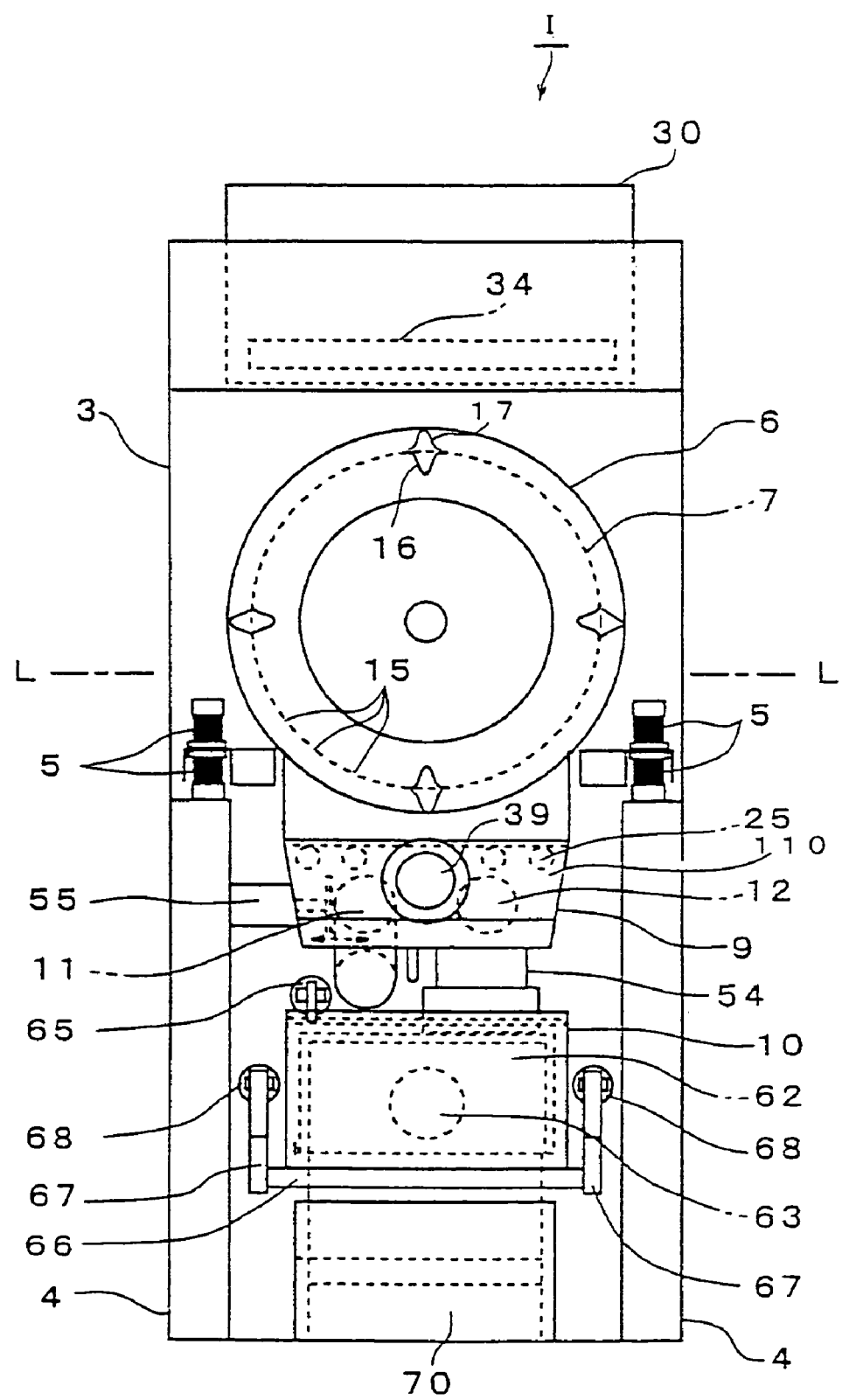
FIG. 2 shows a front view illustrating an inner structure of the used paper diaper processing equipment I in Example 1.
Figure 3:
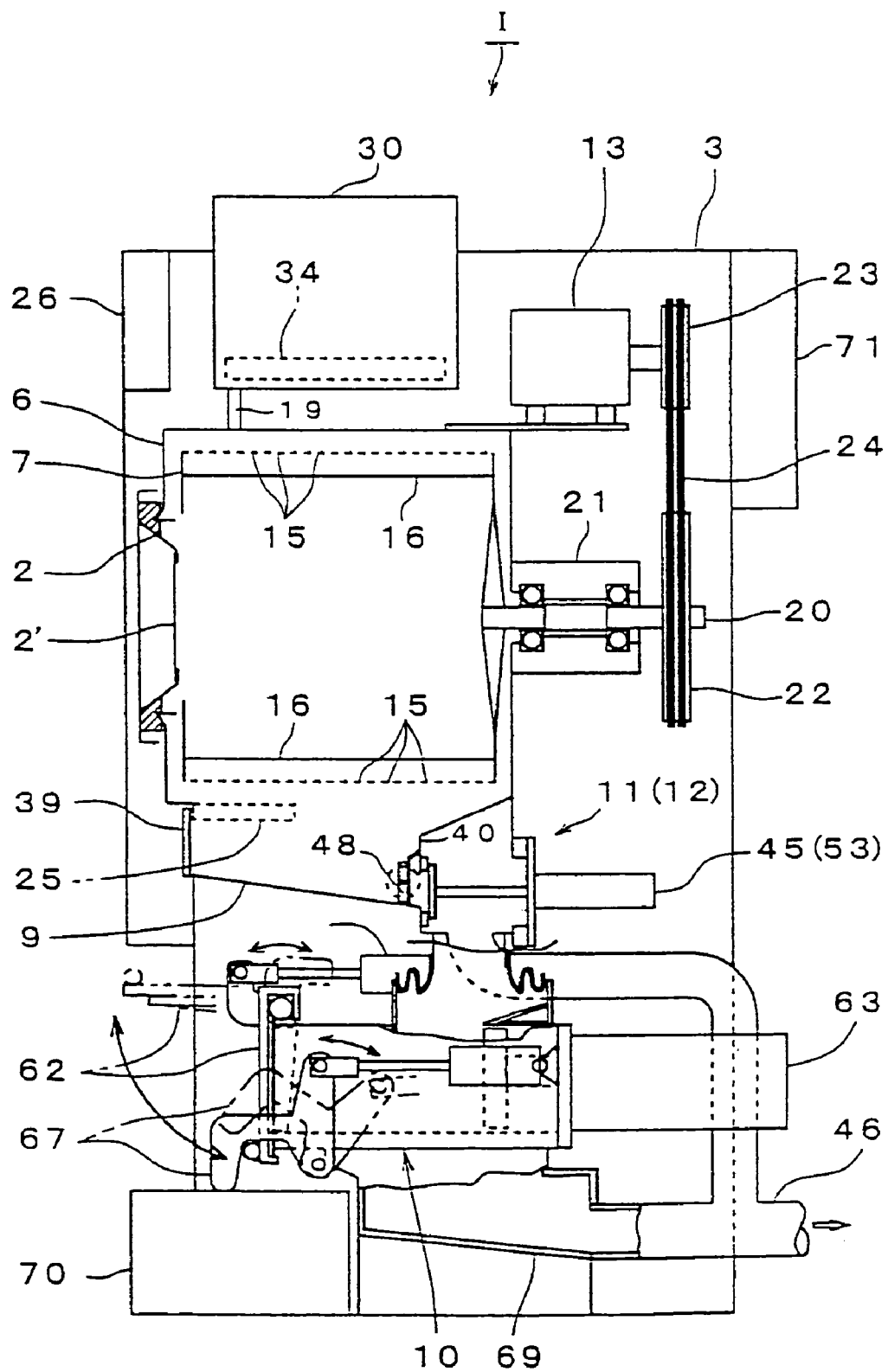
FIG. 3 shows a side cross-sectional view illustrating an inner structure of the used paper diaper processing equipment I in Example 1.

FIG. 1 (*a*) is a front view of an example of paper diaper processing equipment I, and FIG. 1 (*b*) is a rear view thereof. FIG. 2 is an explanation drawing of the inner structure seen from the front, and FIG. 3 is a cross-sectional view of the inner structure seen from the right side.

The paper diaper processing equipment I had housing 3 with an opening and closing door at the front, outer barrel 6 installed via shock absorbing material 5 on support frame 4, rotating drum 7 installed in free rotation in the outer barrel 6 for containing a used paper diaper, receiving tank 9 installed at the bottom of outer barrel 6, which can contain absorbing material breakup substance or excreta of a broken up paper diaper, filtering and separating mechanism 10 installed in the downstream of the receiving tank 9, processing liquid feeding means 19 for feeding processing liquid in the outer barrel 6, filtering and liquid discharging means 110 for filtering contents of receiving tank 9 and discharging processing liquid containing excreta into a sewage treatment facility, main drain pipe 46 as a discharging means for discharging contents of receiving tank 9 to filtering and separating mechanism 10, motor 13 to drive rotation of rotating drum 7, processing liquid level detecting means 38 for detecting at least a processing liquid level in receiving tank 9 and control equipment for monitoring the level by receiving a detection signal from processing liquid level detecting means 38 and controlling the above-described units.

Rotating drum 7 served as an inner barrel for outer barrel 6 and had a horizontally laid cylinder shape with a bottom and a circular charging port at the front surface, which was made of stainless steel. Rotating drum 7 had many through holes with a diameter of 6-8 mm on the circumferential wall.

Further, on the inner circumferential wall of rotating drum 7, stirring protrusions 16 having a half-elliptical cross-section (so called hat-like) were arranged at four places with an equal angle toward axial direction, for hanging and stirring a used diaper during rotation.

Also, on the outer circumferential wall of rotating drum 7, stirring protrusions 17 were provided for stirring the processing liquid in receiving tank 9 to promote floating of a cover material breakup substance and an absorbing material breakup substance.

Rotating drum 7 consisted of the above-described configuration, and had shaft 20 projecting out backward from the rear end plane, which was supported in outer barrel 6 through bearing 21 arranged at rear plane of outer barrel 6. Pulley 22 was fixed at the tip of shaft 20 projected out from bearing 21, and belt 24 was stretched between this pulley 22 and pulley 23 of inverter motor 13 so that rotating drum 7 can rotate reciprocally for stirring, or rotate in one direction for breakup processing or dewatering processing by an action of motor 13. (Therefore, in the used paper diaper processing equipment, motor 13 or pulleys 22 and 23 and the like had a function as a driving means for the rotating drum.) This rotating drum driving means had been designed so as to be able to change over between the first driving mode for strongly stirring and breaking up a paper diaper heated by a hot aqueous solution of swelling suppressant as a processing liquid to a degree to break up a paper diaper by rotating the rotating drum by an inverter control and the like, and the second driving mode for dewatering covers remained in the rotating drum by rotating the rotating drum at a high speed.

Outer barrel 6 installed at the outer side of rotating drum 7 had a nearly cylinder-like air-tight shape, with a box-like receiving tank 9 built in at the bottom end part, and the lower half part including receiving tank 9 had a function as a processing liquid storage tank, and receiving tank 9 had electric heater 25 (heating temperature: 80-100° C.) with waterproof treatment by sealed glass and the like, as a heating means. A temperature sensor was provided in outer barrel 6 (not shown in Fig.) to control a temperature of processing liquid at a temperature specified by operation panel 26 and the like, based on a signal from the temperature sensor.

In the front surface of outer barrel 6, an opening port communicating to a charging port of rotating drum 7 was provided, and sealing materials were provided at both of the opening port and opening-closing door 2 so as to keep sealed covering the opening port when the opening-closing door 2 was closed. Opening-closing door 2 had circular plate-like pressure proofing glass window 2' to allow visual observation of the inside of rotating drum 7.

Furthermore, in outer barrel 6, processing liquid feeding means 19 was equipped for feeding water or an aqueous solution of swelling suppressant as a processing liquid. Processing liquid feeding means 19 also had a swelling suppressant charging means for providing an aqueous solution of swelling suppressant by adding a swelling suppressant to processing liquid used for immersing a paper diaper, deodorant charging means for charging deodorant and chemical agents charging means for charging chemical agents such as disinfectant or antibacterial agent.

Specifically, the processing liquid feeding means was composed of, as shown in FIG. 1 (*b*), reservoir tank 30 installed at the upper part of housing 3, reserved water feed valve 31 for feeding tap water into reservoir tank 30, swell suppressant feeding means for feeding swell suppressant into reservoir tank 30, electric heater 34 installed in reservoir tank 30, processing liquid feed valve 33 for flowing down processing liquid stored in reservoir tank 30 into outer barrel 6 and various pipelines connecting these and the like. A hot water feed valve was also equipped for feeding hot water from a water boiler installed separately to reservoir tank 30 for feeding preheated hot water to reservoir tank 30.

Further, the swelling suppressant feeding means also had a swelling suppressant tank (not shown in Fig.) for storing a swelling suppressant, a swelling suppressant feed pump 35 for feeding specified amount of swelling suppressant from this swelling suppressant tank to reservoir tank 30 and pipelines connecting these and the like.

A chemical agent charging means was designed to be composed of a chemical agent tank (not shown in Fig.) for storing a desired chemical agent, chemical agent charging pump 36 for feeding the chemical agent in this chemical agent tank into reservoir tank 30 and pipelines connecting these and the like.

Receiving tank 9 having inside thereof a processing room built in the above-described outer barrel 6, was a tank for storing a processing liquid mainly containing absorbing material breakup substance passed through holes 15 of rotating drum 7 among insoluble components of a broken up paper diaper, for example, absorbing material breakup substances such as a polymer with high water absorbability, cellulose and the like condensed or coagulated by a swell suppressant, cover material breakup substances such as polyolefin front cover sheet and non-woven fabric sheet of inner surface cover sheet, others such as rubber for preventing leakage, and had a sufficient volume to store the processing liquid.

Receiving tank 9 was also designed to have a front to back dimension of an upper surface opening to be at least not smaller than that of rotating drum 7 and a right to left dimension to be not smaller than a radius of rotating drum 7, so that broken up components in rotating drum 7 could be smoothly stored in receiving tank 9 after coming out from through holes 15 of rotating drum 7. Thus, broken up components could be smoothly stored, and clogging of the breakup substance between rotating drum 7 and outer barrel 6 could be prevented.

Figure 4:
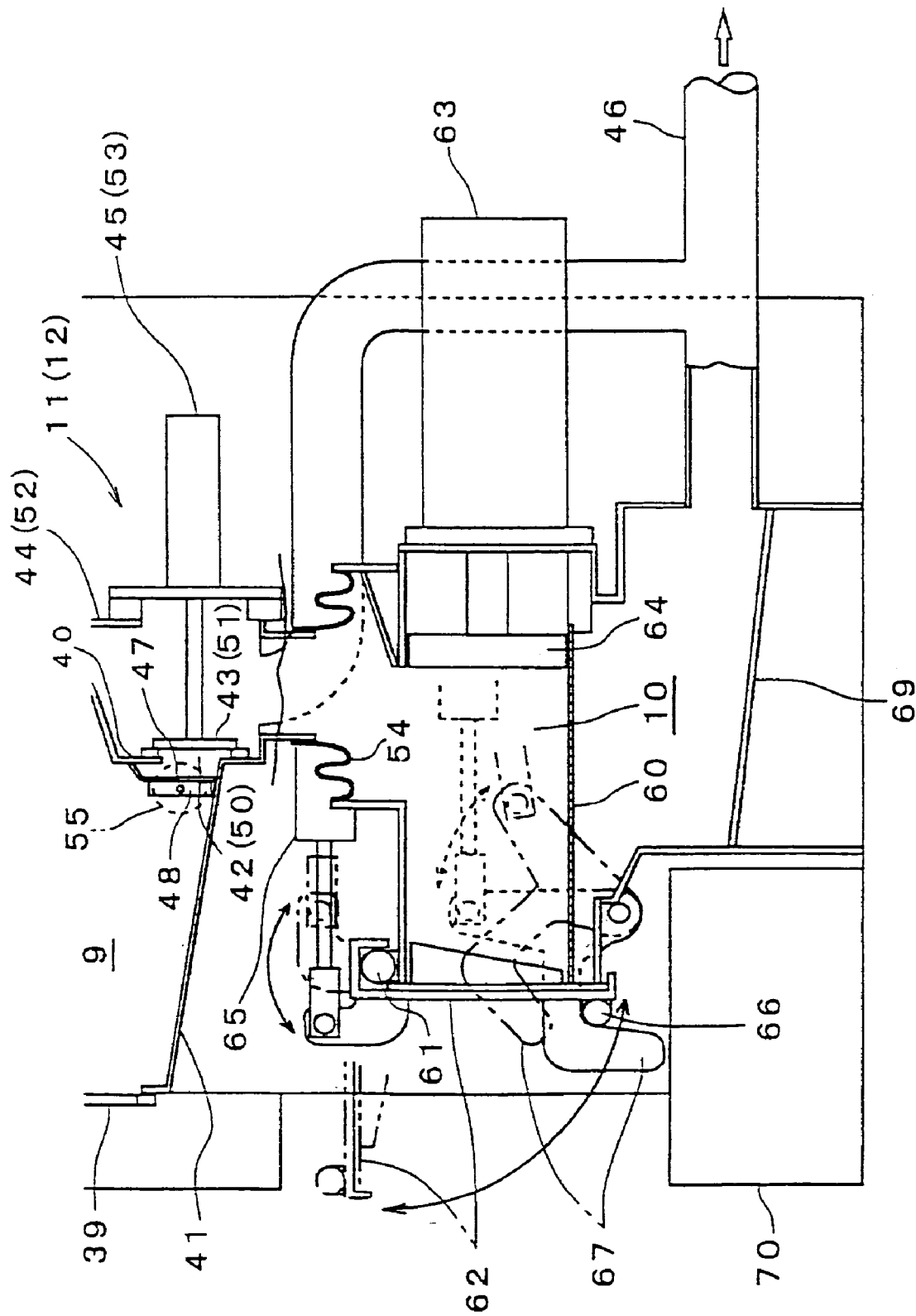
FIG. 4 shows a magnified cross-sectional view of the vicinity of the filtering and separating mechanism of the used paper diaper processing equipment I in Example 1.

Further, receiving tank 9 in the equipment in Example 1 had, as shown in FIG. 3 and FIG. 4, observation window 39 at the front surface and communicating tube 37 at the bottom, first discharging valve 11 and second discharging valve 12 at upright plane 40 at the hollowed step section formed in the rear part. The width of the left to right side walls was designed to be gradually decreased toward the bottom plane side, and bottom plane 41 had downward inclination toward upright plane 40 as an opening of each valve, so that excreta could be discharged smoothly together with processing liquid from first discharging valve 11 into the sewage treatment facility, and the processing liquid with absorbing material breakup substance being floated could be discharged smoothly from second discharging valve 12 to filtering and separating mechanism 10.

The above-described communicating tube 37 is a component of a processing liquid level detecting means for detecting the processing liquid level in the processing room, and as shown in FIG. 1 (b), extended to the position a little higher than the center of rotating drum 7 at the rear surface of housing 3, having on the way a plurality of processing liquid level detectors 38 at various heights, composing major parts of a processing liquid level detecting means. In the present Example, first liquid level detecting means 38a was equipped at the position a little lower than the center of rotating drum 7 for detecting and monitoring the standard processing liquid level, second liquid level detecting means 38b at a little higher position for detecting an upper limit of the liquid level, and third liquid level detecting means 38c at a little higher position than first discharge valve 11. Actions of these liquid level detecting means 38a, 38b and 38c will be explained later.

Figure 5:
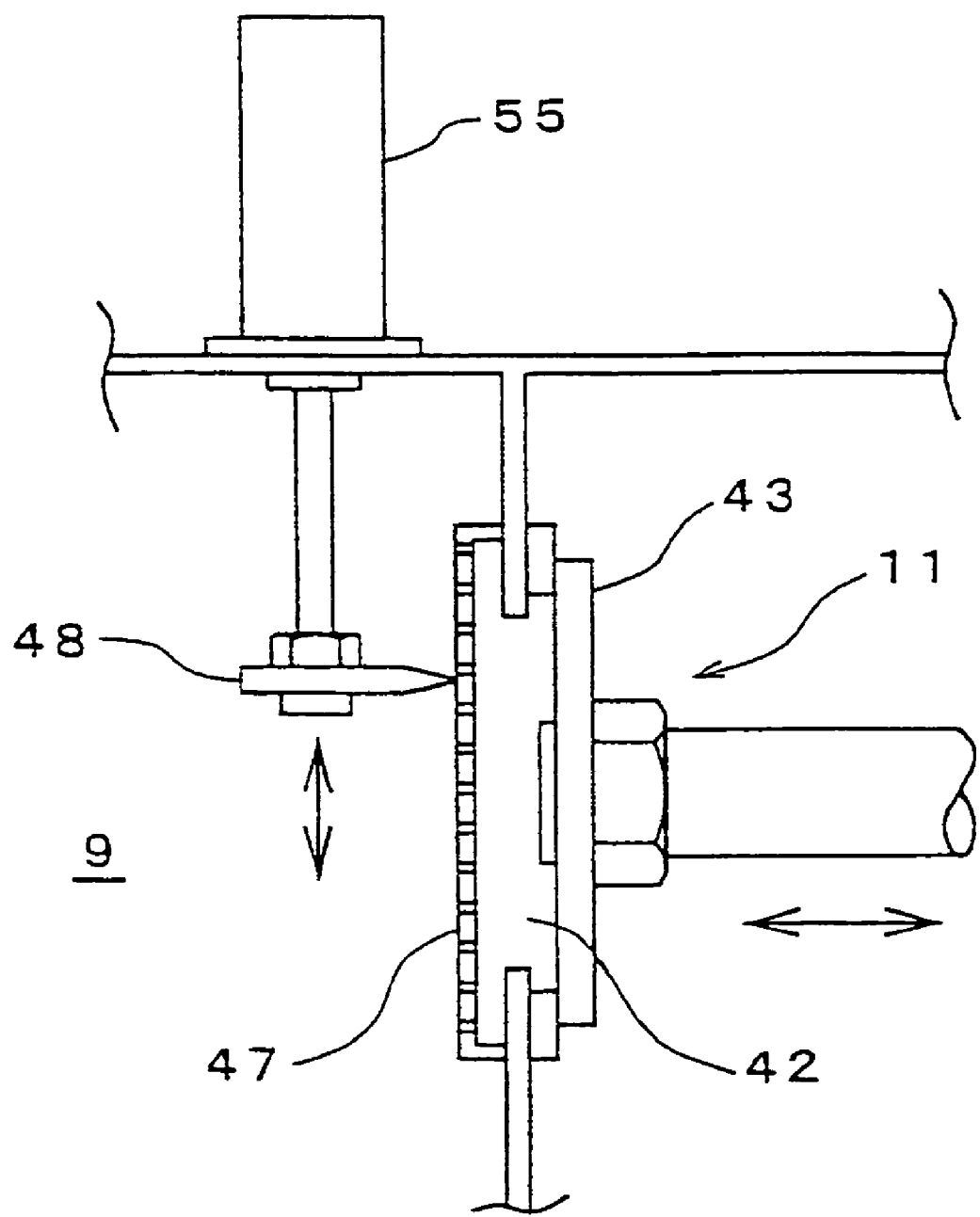
FIG. 5 shows a side cross-sectional view illustrating an inner structure of the used paper diaper processing equipment I in Example 1.

Further, in the present Example, a filtering and liquid discharging mechanism for discharging excreta and processing liquid into a sewage treatment facility, while leaving absorbing material breakup substance from absorbing material breakup substance, excreta and the like stored in receiving tank 9, was installed at upright plane 40 in the above-described first discharging valve 11 side. This filtering and liquid discharging mechanism had, as shown in FIG. 5, filtering material 47 such as punched board and mesh with many small holes, at an upper stream side of first discharging port 42 of first discharging valve 11, that is, at an inside of receiving tank 9, for covering first discharging port 42 and sliding scraper 48 on the inner surface of receiving tank 9 of this filtering material 47. As the filtering material 47 used in this filtering and liquid discharging mechanism, a material with a pore size allowing excreta to pass through but not allowing an absorbing material breakup substance to pass through, was selected. Further, scraper 48 was designed so that it could prevent clogging by lateral reciprocating movement by cylinder for scraper 55 attached to a side surface of receiving tank 9, by sliding on the surface of filtering material 47 and scraping absorbing material breakup substance adhered to filtering material 47.

First discharging valve 11 was composed of circular disk type of valve body 43 for opening and closing first discharging port 42 provided at upright plane 40 of receiving tank 9 and first discharging cylinder 45 for driving the above-described valve body 43 by installing at the rear surface of first box section 44 provided to help the hollowed step section. Therefore, first discharging port 42 was designed to be closed by pushing valve body 43 when the rod of first discharging cylinder 45 was extended, while first discharging port 42 was released by a backward movement of valve body 43 when the rod was pulled to the cylinder tube side. It was also designed so that excreta in receiving tank 9 could flow together with processing liquid toward main drain pipe 46 connected to the bottom plane via the inside of first box section 44, and discharged from the main drain pipe 46 into a waste water treating facility.

Second discharging valve 12 had a configuration similar to that of the adjacent first discharging valve 11, and was composed of circular disk type valve body 51 for opening and closing second discharging port 50 provided at upright plane 40 of receiving tank 9 and second discharging cylinder 53 for driving the above-described valve body 51 by installing at the rear surface of second box section 52. Therefore, second discharging port 50 was designed to be closed by pushing valve body 51 when the rod of second discharging cylinder 53 was extended, while second discharging port 50 was released by a backward movement of valve body 51 when the rod was pulled to the cylinder tube side. It was also designed so that absorbing material breakup substance in receiving tank 9 could be discharged together with processing liquid toward filtering and separating mechanism 10 through connecting pipe 54 connecting to the bottom plane via the inside of second box section 52. A part of connecting pipe 54 was a flexible tube so that vibrations could be absorbed so as not to be transferred to filtering and separating mechanism 10, when breakup substance receiving tank 9 vibrated together with outer barrel 6.

Filtering and separating mechanism 10 was a relatively firm metal box, and had, at the bottom plane, a punched metal plate as filtering material 60 suitable for filtering absorbing material breakup substance of a paper diaper, and at the front surface, opening-closing lid 62 for opening and closing toward the front direction around the center of upper end shaft 61. Filtering and separating mechanism 10 also included, at an inner part, compression plate 64 moving forward and backward, installed at the front end of the rod of compression cylinder 63 at the rear surface, and at the outer upper surface, lid opening-closing cylinder 65 for driving opening and closing of the above-described opening-closing lid 62. Filtering and separating mechanism 10 also included, at the outer side surface, compression cylinder 63 for locking axially attached with hook 67 connectable to lock pin 66 projected to lower left and right parts of opening-closing lid 62 and could rotate each hook 67, and at the upper surface, discharged liquid box 69 so that communication with receiving tank 9 became possible by connecting lower end of the above-described connecting pipe 54 and lower part of filtering material 60 could be covered, and at the lower side surface of the discharging liquid box 69, main drain pope 46 to a sewage treatment side was connected. Here, at least one of the front opening part of opening-closing lid 62 and filtering and separating mechanism 10 was provided with a seal material (not shown in Fig.) for maintaining a liquid-tight state when opening-closing lid 62 was closed, to secure no outward leakage of processing liquid and the like introduced from receiving tank 9. Further, cake recovering container 70 was provided at the lower part of opening-closing lid 62, so that compression plate 64 could further move forward when the rod of compression cylinder 63 was further extended after opening-closing lid 62 was opened, and thus cake could be dropped and stored in cake recovering container 70.

[Used Paper Diaper Processing]

(1) Swelling Suppression Step

Twenty pieces of used paper diapers, provided by a nursing home for the aged, were first charged in rotating drum 7 by opening opening-closing door 2 and turned on the start switch on operation panel 26.

Processing liquid feed valve 33 was opened by control equipment 71, after confirming that opening-closing door 2 was in the closed state based on a signal from door opening-closing detector (not shown in Fig.) installed on housing 3, and then 70 L of an aqueous solution containing a swelling suppressant (1% by weight of calcium chloride) and a disinfectant/deodorant (1% by weight of sodium hypochlorite), preheated (at 85-100° C.) and stored in reservoir tank 30, was fed into outer barrel 6.

An aqueous solution of swelling suppressant (processing liquid) with a specified concentration (0.3-3% by weight) was stored in reservoir tank 30, by charging the specified amount of swelling suppressant (calcium chloride) by operating swelling suppressant feed pump 35, and the specified amount of water by opening reserved water feed valve 31, under control of control equipment 71. Therefore, when the start switch was on, this processing liquid was fed into the processing room to immerse the paper diaper in rotating drum 7. (temperature: room temperature, drum rotation: total 30 minutes by repeated cycle of 30 rpm×12 sec. of rotation/5 sec. of termination/12 sec. of reversed rotation/5 sec. of termination).

In the present Example, as shown by symbol L in FIG. 2, the processing liquid was fed to the position lower than the center of rotating drum 7 and processing liquid feed valve 33 was closed by control equipment 71 based on a signal from first liquid level detector 38a, when the level of this processing liquid was detected by the above-described first liquid level detector 38a.

When the processing liquid level in the processing room was raised up to a dangerous zone, the feed of processing liquid was compulsorily stopped by control equipment 71 based on a signal from the above-described second liquid level detector 38b to avoid a trouble of processing liquid overflow.

When the paper diaper was immersed in the aqueous solution of swelling suppressant, not only swelling of the polymer with high water absorbability in the paper diaper was suppressed and not swelled due to an action of the swelling suppressant, but also the polymer with high water absorbability absorbed and swelled by moisture such as urine contracted and squeezed out moisture to form small particles or powders, while the polymer with high water absorbability having not swelled also remained as small particles or powders without absorbing moisture. Therefore, the volume of the paper diaper in rotating drum 7 was decreased, and no increase was observed.

(2) Breakup Step

After the paper diaper in rotating drum 7 was immersed by the specified amount of the aqueous solution of swelling suppressant fed into outer barrel 6, rotating drum 7 was rotated in one direction due to rotation of motor 13 by control equipment 71, and by this rotation, the paper diaper was stirred and broken up in a hot state.

By stirring the paper diaper in a hot processing liquid (an aqueous solution of a swelling suppressant), disinfection or sterilization was performed, and simultaneously bonding strength (adhesion strength) between a front cover sheet (polyolefin sheet and the like) and a non-woven fabric composing the paper diaper was weakened and the cover sheet was softened, facilitating easy delamination and breakup thereof.

When opening-closing door 2 was closed, the processing room was sealed and there was no leak of malodor during the breakup step. Processing liquid could be discharged smoothly in the liquid discharging step described later, by enabling introduction of outer air into the processing room by opening a check valve (not shown in Fig.) installed by communicating the processing room and main drain pipe 46. Malodor did not leak out from the processing room to the outside during the above-described breakup step by compulsorily closing this check valve by a solenoid.

As described above, when the paper diaper heated in the high temperature processing liquid was rotated in one direction by the rotation of rotating drum 7, the paper diaper could be easily broken up by a falling down impact after once hung up high by stirring protrusions 16. The paper diaper was also broken up by a pulling force of other paper diapers during the stirring. In particular, the heat-sealed part of the front cover sheet of the paper diaper was softened by heat, and thus inner absorbing materials came out through a delaminated part thereof. Finally, the paper diaper was broken up in pieces.

The inner polymer with high water absorbability that is broken up solidified to small particles or powders, and precipitated at the bottom of receiving tank 9 by passing through holes 15 of rotating drum 7. Therefore, the trouble of stopping rotation of rotating drum 7 by blocking of the swollen polymer with high water absorbability between rotating drum 7 and outer barrel 6 was eliminated. Thus, it was confirmed that the clearance could be designed to be narrower than the conventional without any problem. Namely, it is considered that outer barrel 6 could be smaller than the conventional outer barrel even if rotating drum 7 with the same size was equipped, and compact sizing of processing equipment 1 could be promoted.

On the other hand, fiber materials such as cellulose and the like composing absorbing materials along with a polymer with high water absorbability floated in the processing liquid in pieces as dispersed state by delamination of cover materials, and gradually precipitated at the bottom of storage tank 9 via through holes 15 of rotating drum 7.

With progress of the breakup, absorbing materials such as a polymer with high water absorbability and cellulose were removed from covers and gradually came out of rotating drum 7 via through holes 15 of rotating drum 7, and precipitated at the bottom of receiving tank 9, but covers such as the front cover sheet and the non-woven fabric sheet could not be broken up in pieces even by delamination of the heat sealed part and did not pass through holes 15 of rotating drum 7. Therefore, cover material breakup substance remained in rotating drum 7 even if the breakup progressed. Insoluble materials such as pressure sensitive adhesive tape also remained in rotating drum 7.

Heater 25 in receiving tank 9 continued heating during this breakup step so that the temperature of the processing liquid did not go down.

(3) Cover Material Breakup Substance Removing Step

After the cover material breakup substance removing step, the processing liquid containing excreta and the absorbing material breakup substance in a dispersed state was filtered, while leaving the cover material breakup substance in rotating drum 7, and the processing liquid containing excreta was discharged into a sewage treatment facility, while absorbing material breakup substance remained.

(4) Filtering Step and Liquid Discharging Step

In this occasion, the processing liquid in receiving tank 9 was discharged into a sewage treatment facility by opening first discharging valve 11, while filtering by the filtering and discharging mechanism.

Specifically, first discharging valve 11 was opened and scraper 48 slid reciprocally along the surface of filtering material 47 by scraper cylinder 55 while rotating drum 7 was rotated. When first discharging valve 11 was opened, processing liquid in receiving tank 9 was discharged together with excreta through main drain pipe 46 into a sewage treatment facility side. Then, even though the processing liquid containing excreta passed through fine pores of filtering material 47, most parts of powder of absorbing material breakup substance such as cellulose, a polymer with high water absorbability and the like could not pass through but remained on the filter material, and the absorbing material breakup substance was continuously scraped off by scraper 48. Therefore, filtering material 47 was maintained unclogged and the powder of absorbing material breakup substance adhered to filtering material 47 was repeatedly released and floated in the processing liquid left in receiving tank 9. Thus, adhesion of powder of absorbing material breakup substance as a cake on the inner surface of filtering material 47 was prevented. Further, if the absorbing material breakup substance adhered to the inner surface of filtering material 47 as a cake, it did not break up in pieces even if water is added. Thus, such trouble could be avoided in advance.

In such a way, the processing liquid in receiving tank 9 was discharged. In the present Example, during lowering of the processing liquid level in the processing room, discharge of the processing liquid was stopped after a certain amount of the processing liquid was discharged. Specifically, when the discharge amount reached 70-80% of the processing liquid (70 L) fed in the processing room, the discharging step was stopped. The level of the processing liquid when discharge was stopped was detected by the above-described third liquid level detector 38c, and first discharging valve 11 was closed by control equipment 71 based on a signal from this detector 38c. The processing liquid level detected by the above-described third liquid level detector 38c was such level as was sufficient to maintain a floating state of powder such as cellulose and the like in the processing liquid left in receiving tank 9 undischarged. Thus, it was confirmed that remaining of the processing liquid of 14-21 L was enough to avoid a possible trouble that powders of absorbing material breakup substance blocks in this embodiment.

Thus, by maintaining a floating state of powder of the absorbing material breakup substance, such a problem could be avoided in advance that blocked absorbing material breakup substance did not break up in pieces and made subsequent treatment in downstream difficult.

(5) Washing Step

After completion of the liquid discharging step, water was replenished as a processing liquid in the processing room to wash covers by rotation of rotating drum 7, and also wash the cellulose and the polymer with water absorbability left in the liquid discharging step. The polymer with water absorbability shrunk by the swelling suppressant in the breakup step did not swell again even when contacting with water.

In this washing step, the processing liquid in receiving tank 9 was stirred by stirring protrusions 17 via rotation of rotating drum 7, and washing of the cellulose and the polymer with water absorbability could be promoted.

After completion of the washing step, the liquid discharging step was conducted again by opening first discharging valve 11 to discharge the processing liquid in the processing room together with excreta into a sewage treatment facility side. In this step, similarly as in the above-described liquid discharging step, clogging by cellulose was prevented by reciprocal sliding of scraper 48 on the surface of filtering material 47. Then the discharge was stopped by closing first discharging valve 11 when third liquid level detector 38c detected a lowered liquid level, and the processing liquid was left in receiving tank 9 in such an amount as sufficient for enabling powder of absorbing material breakup substance to be floated.

(6) Liquid Discharging Step

After completion of the liquid discharging step, second discharging valve 12 in receiving tank 9 was opened based on a signal from control equipment 71, and the processing liquid in receiving tank 9 flowed down together with powder of the absorbing material breakup substance toward filtering and separating mechanism 10, and the processing liquid was discharged into a sewage treatment facility side while absorbing material breakup substance was maintained by this filtering and separating mechanism 10.

(7) Absorbing Material Breakup Substance Recovering Step

After completion of the filtering and separating step, absorbing material breakup substance was compressed to a cake by extending a rod of compression cylinder 63 and moving compression plate 64 forward. Then, after opening opening-closing door 62, the rod of the compression cylinder 63 was further extended to further move compression plate 64 forward to drop and recover the cake in cake recovering container 70.

The recovered cake-like absorbing material breakup substance can be disposed as general waste, because it was thermally sterilized or thermally disinfected.

Further, the cover material breakup substance left in rotating drum 7 can also be disposed as general waste after being taken out of rotating drum 7, because it was thermally sterilized or thermally disinfected.

[Evaluation]

Using the above-described used paper diaper processing equipment, processing results of the paper diaper were compared regarding quantity of the processed paper diapers, temperature of the processing liquid and presence of disinfectant and deodorant.

By changing the quantity of the used paper diapers to be processed, quantity of the paper diapers left in rotating drum 7, and quantity of cover material breakup substance from broken up paper diapers and dewatering state thereof were studied. In addition, the separation state of absorbing material breakup substance and excreta was also studied qualitatively on filtered and recovered materials. Further, the weights of cover material breakup substance and absorbing material breakup substance after filtering, recovering and dewatering operations were also measured.

In a processing method at a temperature not higher than about 60° C., the paper diaper could be washed in a non-swollen or slightly-swollen state by an action of calcium chloride and the like, and the quantity of processed paper diapers per one cycle could be increased.

In addition, the odor of excreta of the processing liquid containing excreta disappeared completely even when the processing liquid was processed without the presence of disinfectant such as sodium hypochlorite and the like or deodorant, and thus it was proven that processing by a hot processing liquid was also effective on deodorization.

Further, there was no malodor of excreta generated from the processing equipment 1 during processing irrespective of the presence of disinfectant or deodorant.

In particular, when the temperature of the processing liquid was not lower than 80° C., all of the paper diapers contained were broken up in rotating drum 7, and cover material breakup substance and absorbing material breakup substance could be separated and recovered in a sterilized and odorless state.

Further, when the hot processing liquid was used or disinfectant or deodorant was added, E. coli was not detected from the cover material breakup substance and the absorbing material breakup substance recovered, and thus it was shown that the used paper diaper processing method of the present invention was effective in view of sterilization of waste as well as reduction of waste volume.

Example 2

Used Paper Diaper Processing Equipment II

[Configuration of Equipment]

A front view and a rear view of used paper diaper processing equipment II are shown in FIG. 1 (a) and FIG. 1 (b), similarly as in the used paper diaper processing equipment I. On the other hand, FIG. 6 explains an inner structure of the used paper diaper processing equipment II seen from the front, and FIG. 7 shows a cross-sectional view of an inner structure of the used paper diaper processing equipment II seen from the right side.

As shown in these Figs., the paper diaper processing equipment 1 of the present Example is roughly composed of, in housing 3 having opening-closing door 2 at the front, outer barrel 6 installed on support frame 4 via shock absorbing material 5, rotating drum 7 installed in free rotation in the outer barrel 6 with a specified clearance for containing a used paper diaper, a filtering and separating mechanism 10 installed at the downstream side of outer barrel 6, a processing liquid feeding means 19 for feeding processing liquid into outer barrel 6, a swelling suppressant charging means for preparing an aqueous solution of swelling suppressant by containing a swelling suppressant in a processing liquid for immersing a paper diaper, filtering and discharging means 110 for filtering contents of outer barrel 6 and intermittently discharging a processing liquid containing excreta into a sewage treatment facility side, discharging means 130 for discharging contents in the outer barrel 6 by opening and closing the bottom of outer barrel 6, motor 13 for driving rotation of rotating drum 7, over flow liquid discharging means 120 for filtering contents in outer barrel 6 and overflowing excessive processing liquid and control equipment 71 for controlling the above-described units.

Rotating drum 7 served as an inner barrel for outer barrel 6 and had a shape and configuration similar to those shown in Example 1 Rotating drum 7 had stirring protrusions 16 arranged on the inner circumferential surface of rotating drum 7 for hooking, break up and stirring a used paper diaper during rotation, similarly as in Example 1. Further, stirring protrusions 17 were arranged on the outer circumferential surface of rotating drum 7, similarly as in Example 1, for stirring a processing liquid in outer barrel 6 and promote floating of absorbing material breakup substance. The stirring protrusions 17 were designed so as to thoroughly stir at the clearance zone between outer barrel 6 and rotating drum 7, in particular, and protruded also at both of the front and rear surface ends of rotating drum 7.

Rotating drum 7 consisted of the above-described configuration had shaft 20 projected out backward from the rear end plane, which was supported in outer barrel 6 through bearing 21 arranged at the rear plane of outer barrel 6. Pulley 22 was fixed at the tip of shaft 20 projected out from bearing 21, and belt 24 was stretched between this pulley 22 and pulley 23 of inverter motor 13 so that rotating drum 7 can rotate reciprocally for stirring or rotate in one direction for breakup processing or dewatering processing by an action of motor 13. (Therefore, in the used paper diaper processing equipment, motor 13 or pulleys 22 and 23 and the like had a function as a driving means for the rotating drum.) This rotating drum driving means had been designed so as to be able to change over between the first driving mode for strongly stirring and breaking up a paper diaper heated by a hot aqueous solution of swelling suppressant as a processing liquid to a degree to break up a paper diaper by rotating the rotating drum by an inverter control and the like, and the second driving mode for dewatering covers remained in the rotating drum by rotating the rotating drum at a high speed.

Outer barrel 6 installed at the outer side of rotating drum 7 had a nearly cylinder-like air-tight shape, with a box-like receiving tank 9 built in at the bottom end part, and the lower half part including receiving tank 9 had a function as a processing liquid storage tank, and reservoir tank 9 had electric heater 25 (heating temperature: 80-100° C.) with waterproof treatment by sealed glass and the like, as a heating means. A temperature sensor was provided in outer barrel 6 (not shown in Fig.) to control a temperature of processing liquid at a temperature specified by operation panel 26 and the like, based on a signal from the temperature sensor.

Further, in the front surface of outer barrel 6, an opening port communicating to a charging port of rotating drum 7 was provided, and sealing materials were provided at both of the opening port and opening-closing door 2 so as to keep sealed covering the opening port when the opening-closing door 2 was closed. Opening-closing door 2 had circular plate-like pressure proofing glass window 2' to allow a visual observation for inside of rotating drum 7.

Furthermore, in outer barrel 6, processing liquid feeding means 19 was equipped for feeding water or an aqueous solution of swelling suppressant as a processing liquid. Processing liquid feeding means 19 also had a swelling suppressant charging means for providing an aqueous solution of swelling suppressant by adding a swelling suppressant to the processing liquid used for immersing a paper diaper, deodorant charging means for charging deodorant and chemical agents charging means for charging chemical agents such as disinfectant or antibacterial agent.

Figure 6:
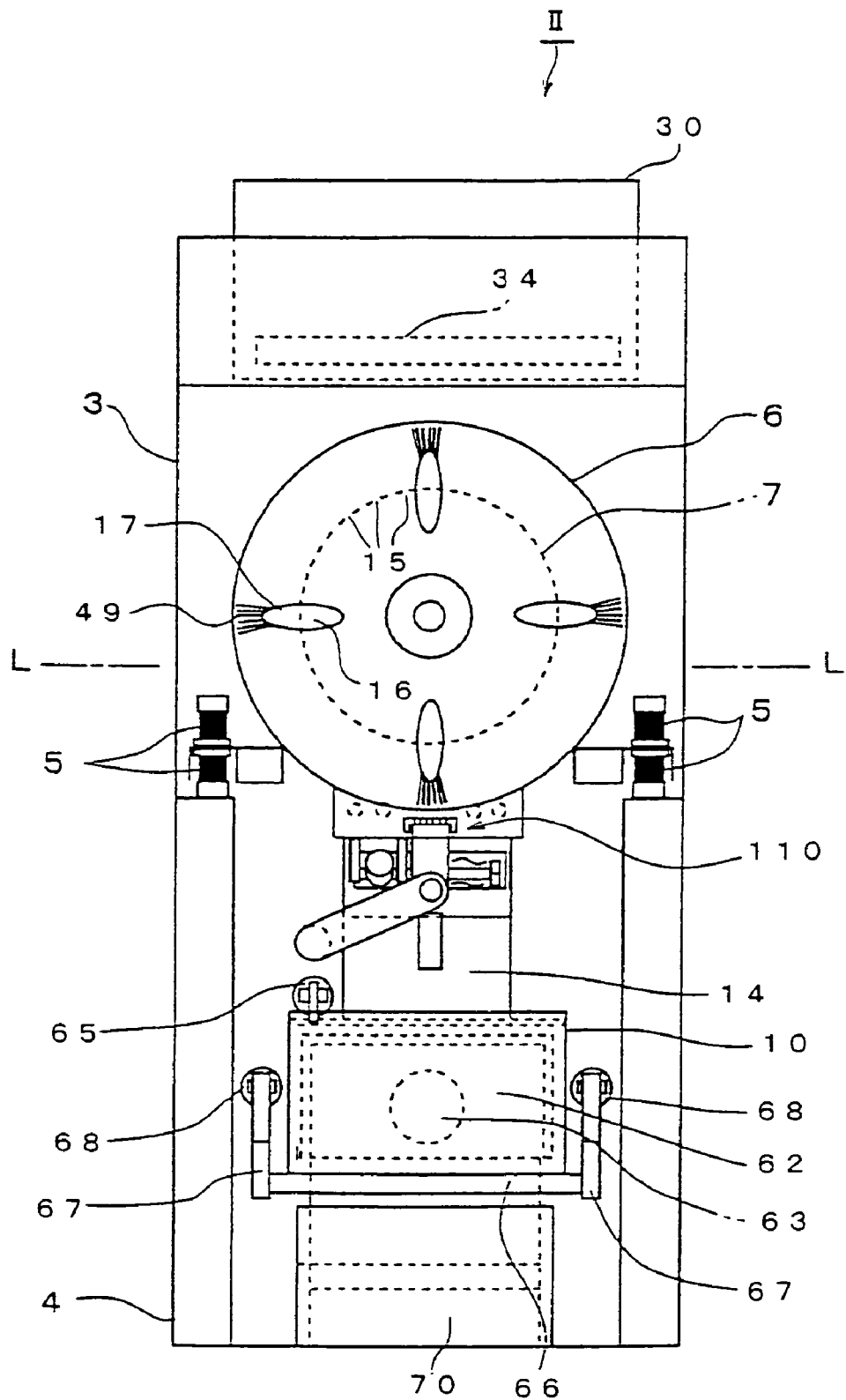
FIG. 6 shows a front view illustrating an inner structure of the used paper diaper processing equipment II in Example 2.
Figure 7:
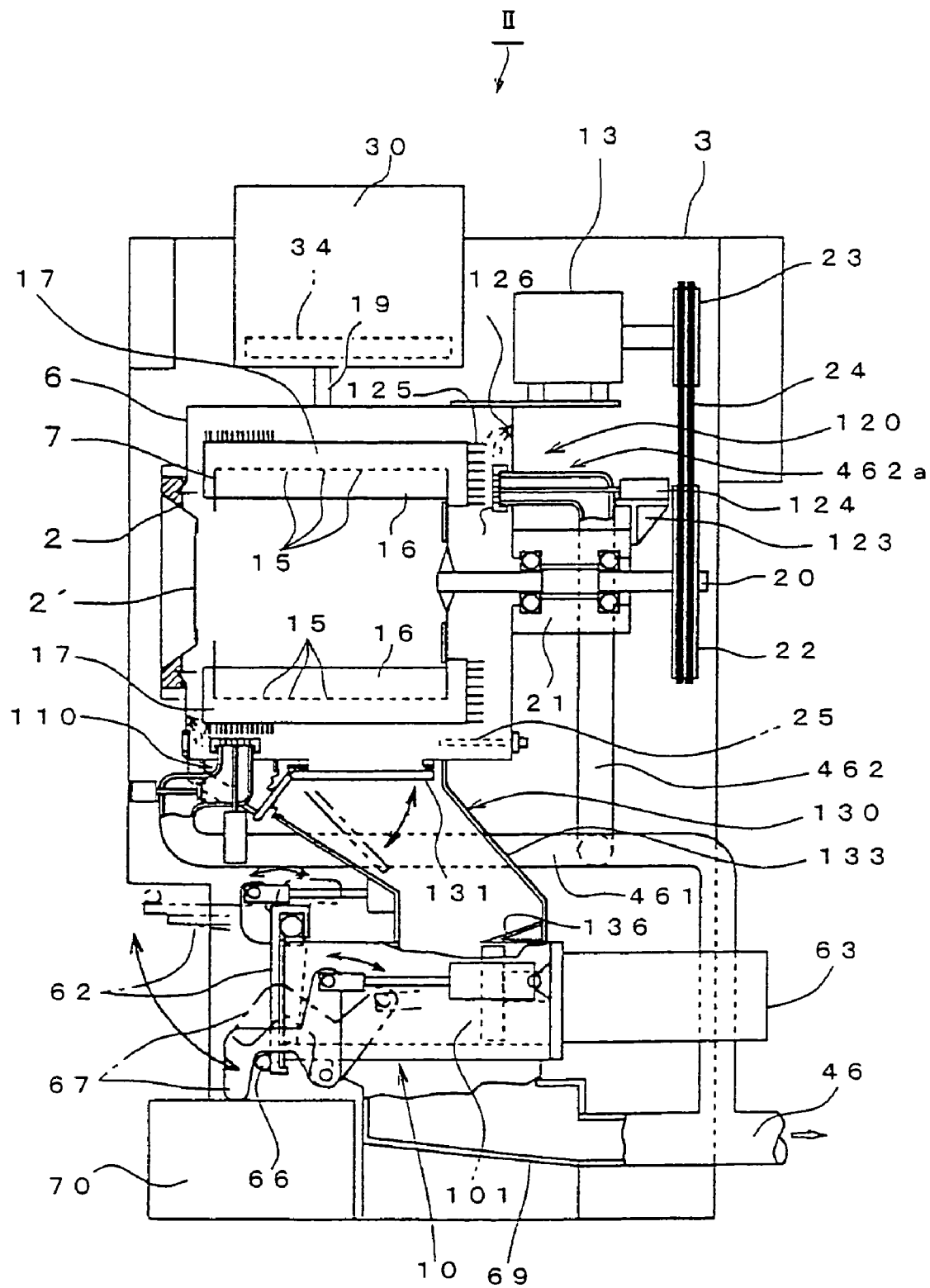
FIG. 7 shows a side cross-sectional view illustrating an inner structure of the used paper diaper processing equipment II in Example 2.

Specifically, the processing liquid feeding means was composed of, as shown in FIG. 1 (b), FIG. 6 and FIG. 7, reservoir tank 30 installed at the upper part of housing 3, reserved water feed valve 31 for feeding tap water into reservoir tank 30, swell suppressant feeding means for feeding swell suppressant into reservoir tank 30, electric heater 34 installed in reservoir tank 30, processing liquid feed valve 33 for flowing down processing liquid stored in reservoir tank 30 into outer barrel 6 and various pipelines connecting these and the like. A hot water feed valve was also equipped for feeding hot water from a water boiler installed separately to reservoir tank 30 for feeding preheated hot water to reservoir tank 30.

Further, the swelling suppressant feeding means also had a swelling suppressant tank (not shown in Fig.) for storing a swelling suppressant, a swelling suppressant feed pump 35 for feeding a specified amount of swelling suppressant from this swelling suppressant tank to reservoir tank 30 and pipelines connecting these and the like.

Chemical agent charging means was designed to be composed of a chemical agent tank (not shown in Fig.) for storing a desired chemical agent, chemical agent charging pump 36 for feeding the chemical agent in this chemical agent tank into reservoir tank 30 and pipelines connecting these and the like.

In the present Example, the above-described filtering and discharging means 110 was installed at a lower front part of outer barrel 6, for filtering and removing insoluble components in the outer barrel 6 and discharging processing liquid containing excreta into a sewage treatment facility side.

Figure 8:
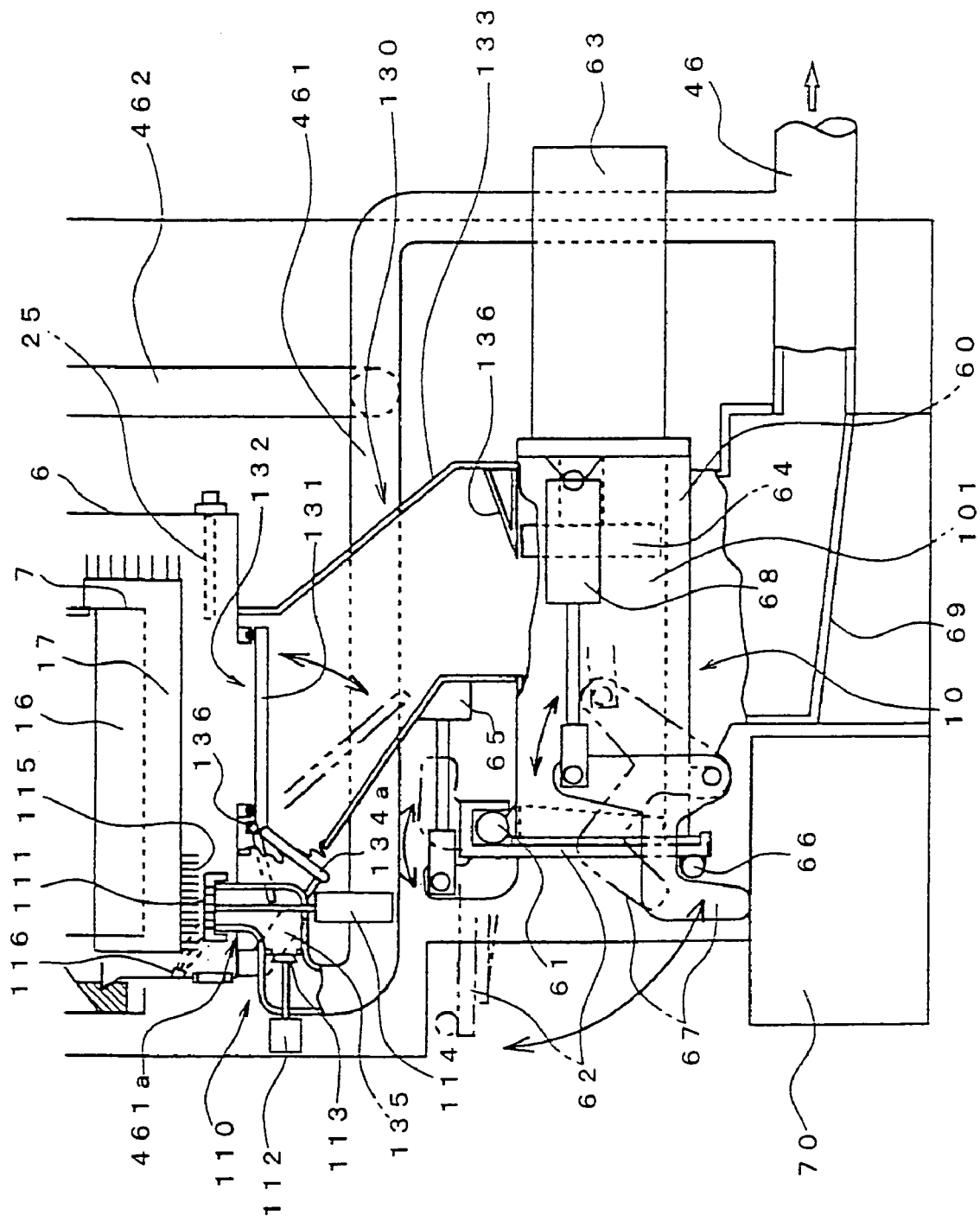
FIG. 8 shows a magnified cross-sectional view of the vicinity of the filtering and separating mechanism of the used paper diaper processing equipment II in Example 2.

The filtering and discharging means 110 was, as shown in FIG. 8, installed at upper stream end part 461a of first branch pipe 461, which was connected as a branch to main drain pipe 46 leading to a sewage treatment facility side. The upper stream end part 461a was installed upwardly from the lower front part of outer barrel 6, whose opening port (discharging port) was capped with a metal mesh filter as filtering material 111, so that insoluble components dispersed in processing liquid could be filtered and removed and processing liquid containing excreta could be discharged into a sewage treatment facility side via first branch pipe 461 and main drain pipe 46. In the vicinity of upper stream end part 461a of first branch pipe 461, opening-closing valve 113 was equipped, which could be opened and closed by a cylinder as forward/backward driving means 112.

In addition, stirring protrusions 17 provided on the outer circumferential surface of rotating drum 7, had brush 115 at opposing position to filtering and discharging means 110, for scraping off and removing cake (that is, for preventing clogging by cake) of absorbing material breakup substance and the like adhered to filtering material 111 provided at filtering and discharging means 110. On the other hand, filtering and discharging means 110 had forward/backward driving means 114 (solenoid or cylinder) for moving filtering material 111 forward or backward toward said brush 115, and spraying means 116 for promoting prevention of clogging of filtering material 111 by spraying toward filtering material 111 and brush 115.

Further, in the present Example, overflow liquid discharging means 120 was installed at a rear middle part of outer barrel 6 (in Fig., it is drawn at upper part for easier view but actually it is located at the side or a little lower position than shaft 20 of rotating drum 7). This overflow liquid discharging means 120 was for filtering and removing insoluble components such as absorbing material breakup substance and the like in outer barrel 6 and for overflowing excessive processing liquid. As shown in FIG. 7, the overflow liquid discharging means 120 was installed at upper stream end part 462a of second branch pipe 462, which was connected, as a branch, to the above-described first branch pipe 461. The upper stream end part 462a was installed inwardly from the rear part of outer barrel 6, whose opening port was capped with a metal mesh filter as filtering material 121, so that insoluble components such as absorbing material breakup substance dispersed in processing liquid could be filtered and removed, and excessive processing liquid could be discharged to a sewage treatment facility side via second branch pipe 462, first branch pipe 461 and main drain pipe 46.

Further, stirring protrusions 17 provided on the outer circumferential surface of rotating drum 7, had brush 125 at an opposing position to overflow discharging means 120, for scraping off and removing cake on filtering material 121 equipped at filtering and discharging means 120. On the other hand, filtering and discharging means 120 had frontward/backward driving means 124 such as a solenoid and a cylinder installed on frame 123 for driving filtering material 121 forward or backward toward this brush 125, and spraying means 126 for promoting prevention of clogging of filtering material 121 by spraying water toward filtering material 121 and brush 125.

At the lower center part of outer barrel 6, discharging means 130 was installed for discharging processing liquid containing insoluble components in the outer barrel 6 to the above-described filtering and separating mechanism 10 installed at a downstream side thereof, by opening and closing opening-closing door 131 provided at the bottom of the outer barrel 6. This discharging means 130 was partitioned, as shown in FIG. 8, by chute wall 133 inclined from opening port 132 formed at the bottom of outer barrel 6 toward a rear bottom part. A longer part of bent formed member in vertical cross-section served as the above-described opening-closing door 131 and pivoting shaft 134 was attached at the bent part, and shorter part 134a was connected to forward/backward driving means 135 for opening and closing the above-described opening port 132 by rotating the opening-closing door 131 around pivoting shaft 134 as a supporting point. The discharging means 130 was designed so that opening-closing door 131 was closed during the breakup step and washing step for a paper diaper by processing liquid, while it was released open after completion of the breakup step (or after completion of the washing step, if practiced), and chute wall 133 was designed for connecting opening port 132 of the bottom of outer barrel 6 and filtering and separating mechanism 10. The lower rear part of this chute wall 133, guide member 136, which was inclined toward the lower front part, was attached for introducing processed material dropped from outer barrel 6 when the above-described opening-closing door 131 was released open.

Filtering and separating mechanism 10 had separation tank 101 formed with a relatively firm metal box, and was, at the bottom plane, equipped with a punched metal plate as filtering material 60 suitable for filtering absorbing material breakup substance of a paper diaper, and at the front surface, opening-closing lid 62 for opening and closing toward the front direction around the center of upper end shaft 61. Filtering and separating mechanism 10 also includes, at an inner part, compression plate 64 moving forward and backward, installed at the front end of rod of compression cylinder 63 at the rear surface, and at an outer upper surface, lid opening-closing cylinder 65 for driving opening and closing of the above-described opening-closing lid 62. Filtering and separating mechanism 10 also includes, at an outer side surface, compression cylinder 63 for locking axially attached with hook 67 connectable to lock pin 66 projected to lower left and right parts of opening-closing lid 62 and could rotate each hook 67, at an upper surface, discharged liquid box 69 so that communication with receiving tank 9 became possible by connecting lower end of the above-described connecting pipe 54 and lower part of filtering material 60 could be covered, and at a lower side surface of the discharging liquid box 69, main drain pipe 46 to a sewage treatment side was connected.

Here, at least one of the front opening part of opening-closing lid 62 and separating tank 101 was provided with a seal material (not shown in Fig.) for maintaining a liquid-tight state when opening-closing lid 62 was closed, to secure no outward leakage of processing liquid and the like introduced from outer barrel 6 via discharging means 130. Further, cake recovering container 70 was provided at the lower part of opening-closing lid 62, so that compression plate 64 could further move forward when rod of compression cylinder 63 was further extended after opening-closing lid 62 was opened, and thus cake could be dropped and stored in cake recovering container 70.

[Used Paper Diaper Processing]

(1) Swelling Suppression Step

A swelling suppression step was performed by the similar operation as in Example 1.

In the present Example, as shown by symbol L in FIG. 6, processing liquid was fed to the position lower than the center of rotating drum 7, and processing liquid feed valve 33 was closed by control equipment 71 based on a signal from first liquid level detector 38a, when level of this processing liquid was detected by the above-described first liquid level detector 38a.

When the processing liquid level in the processing room was raised up to a dangerous zone, feed of processing liquid was compulsorily stopped by control equipment 71 based on a signal from the above-described second liquid level detector 38b to avoid trouble of processing liquid overflow in advance. In addition, for the case when processing liquid level was raised up to higher level than this by accident and the like, the equipment was designed so that processing liquid could overflow from overflow liquid discharging means 120.

(2) Breakup Step and Cover Material Breakup Substance Removing Step

After the paper diaper in rotating drum 7 was immersed by a specified amount of the aqueous solution of swelling suppressant fed into outer barrel 6, rotating drum 7 was rotated in one direction due to rotation of motor 13 by control equipment 71, and by this rotation, the paper diaper was stirred and broken up in a hot state.

By stirring the paper diaper in a hot processing liquid (an aqueous solution of a swelling suppressant), disinfection or sterilization was performed, and simultaneously bonding strength (adhesion strength) between a front cover sheet (polyolefin sheet and the like) and a non-woven fabric composing the paper diaper was weakened and the cover sheet was softened, facilitating easy delamination and breakup thereof.

When opening-closing door 2 was closed, the processing room was sealed and there was no leak of malodor during the breakup step. Processing liquid could be discharged smoothly in the liquid discharging step described later, by enabling introduction of outer air into the processing room by opening a check valve (not shown in Fig.) installed by communicating the processing room and main drain pipe 46. Malodor did not leak out from the processing room to the outside during the above-described breakup step by compulsorily closing this check valve by a solenoid.

As described above, when the paper diaper heated in the high temperature processing liquid was rotated in one direction by the rotation of rotating drum 7, the paper diaper could be easily broken up by a falling down impact after once hung up high by stirring protrusions 16. The paper diaper was also broken up by a pulling force of other paper diapers during the stirring. In particular, the heat-sealed part of the front cover sheet of paper diaper was softened by heat, and thus inner absorbing materials came out through a delaminated part thereof. Finally, the paper diaper was broken up in pieces.

The inner polymer with high water absorbability broken up solidified to small particles or powders, and the granular polymer with high water absorbability went out to outer barrel 6 via through holes 15, and was continuously stirred with the stirring protrusions. Therefore, the trouble of stopping rotation of rotating drum 7 by blocking of the swollen polymer with high water absorbability between rotating drum 7 and outer barrel 6 did not occur.

With progress of the breakup, absorbing materials such as a polymer with high water absorbability and cellulose were removed from covers and gradually came out of rotating drum 7 via through holes 15 of rotating drum 7, but covers such as the front cover sheet and the non-woven fabric sheet could not be broken up in pieces even by delamination of the heat sealed part and did not pass through holes 15 of rotating drum 7. Therefore, cover material breakup substance remained in rotating drum 7 even if the breakup progressed. Insoluble materials such as pressure sensitive adhesive tape also remained in rotating drum 7.

Heater 25 in outer barrel 6 continued heating during this breakup step so that the temperature of the processing liquid did not go down.

When the liquid level was raised due to disturbance by rotation of rotating drum 7, absorbing material breakup substance in the outer barrel 6 was filtered and removed by overflow liquid discharging means 120 installed at a rear upper part of outer barrel 6, and excessive processing liquid containing excreta was also discharged so that the liquid level was always kept adjusted. Further, even when filtering material 121 installed at the overflow liquid discharging means 120 was clogged by absorbing material breakup substance and the like, filtering material 121 was moved forward toward brush 125 attached at stirring protrusions 17 equipped on the outer surface (rear surface) of rotating drum 7, by forward/backward driving means 124, and the brush 125 was contacted with filtering material 121 by rotational force of rotating drum 7, and thus the cake could be removed. In this case, spraying means 126 installed at the vicinity of overflow liquid discharging means 120 sprayed water toward filtering material 121 and brush 125 to promote prevention of clogging on filtering material 121. Thus, powders of absorbing material breakup substance adhered to filtering material 121 could be released and floated in the processing liquid in outer barrel 6.

(3) Filtering Step and Liquid Discharging Step

An opening-closing valve 113 was released by forward/backward driving means 112 of filtering and discharging means 110 installed at a lower front part of outer barrel 6, and the polymer with water absorbability and the cellulose dispersed in the processing liquid was filtered and removed by filtering material 111 capped at upper stream end part 461a of first branch pipe 461, and the processing liquid containing excreta was discharged to a sewage treatment facility side via first branch pipe 461 and main drain pipe 46.

Further, when cake such as the cellulose and the like adhered to filtering material 111 installed at this filtering and discharging means 110, the cake could be scraped off and removed by brush 115, attached at stirring protrusions 17 provided on the outer circumferential surface of rotating drum 7 at a position opposing filtering material 111, by moving forward filtering material 111 with forward/backward driving means 114 during rotation of rotating drum 7 prior to the liquid discharging step, and by repeatedly contacting the brush 115 with filtering material 111 by rotational force of rotating drum 7. In this case, spraying means 116 installed at the vicinity of filtering and discharging means 110 sprayed water toward filtering material 111 and brush 115 to promote prevention of clogging of filtering material 111. Thus, powders of cellulose and the like adhered to filtering material 111 could be released and floated in the processing liquid in outer barrel 6. Therefore, adhesion of powders of cellulose and the like in block to the inner surface of filtering material 111 could be prevented.

Further, brush cleaning of filtering material 111 may be performed during liquid discharging.

In such a way, the processing liquid in outer barrel 6 was discharged. In the present embodiment, during lowering of the processing liquid level in the processing room, discharge of the processing liquid was stopped after a certain amount of the processing liquid was discharged. Specifically, when the discharge amount reached 70-80% of the processing liquid (70 L) fed in the processing room, the discharging step was stopped. The level of the processing liquid when discharge was stopped was detected by the above-described third liquid level detector 38c, and opening-closing valve 113 was closed by an action of forward/backward means 112 in filtering and discharging means 110 by control equipment 71 based on a signal from this detector 38c. The processing liquid level detected by the above-described third liquid level detector 38c was such level as was sufficient to maintain a floating state of the cellulose and the like in the processing liquid left in the bottom part of outer barrel 6 undischarged. Thus, it was confirmed that remaining of the processing liquid of 14-21 L was enough to avoid a possible trouble that powders of the cellulose and the polymer with high water absorbability block in this embodiment.

Thus, by maintaining the floating state of powders of the cellulose and the polymer with high water absorbability, such a problem could be avoided that in particular the cellulose in the absorbing material breakup substance used in a paper diaper could not be dispersed.

(4) Washing Step

After completion of the liquid discharging step, an aqueous solution was fed in outer barrel 6, and cover material breakup substance washed and absorbing material breakup substance left in the liquid discharging step was also washed similarly as in Example 1.

After completion of the washing step, the liquid discharging step was repeated by opening opening-closing valve 113 in filtering and discharging means 110 for discharging the processing liquid in outer barrel 6 together with excreta to a sewage treatment facility side. At this step, similarly as in the above-described liquid discharging step, clogging by absorbing material breakup substance was prevented by repeatedly contacting brush 115 with the surface of filtering material 111. Then the discharge was stopped by closing opening-closing valve 113 based on the detection of a lowered liquid level by third liquid level detector 38c, and the processing liquid was left in outer barrel 6 in such an amount that powders of absorbing material breakup substance could be floated.

(5) Liquid Discharging Step

After completion of the liquid discharging step, opening-closing door 131, which had closed bottom opening section 132 of outer barrel 6, was released by an action of forward/backward driving means 135 in discharging means 130 based on a signal from control equipment 71. The processing liquid in outer barrel 6 flowed down together with absorbing material breakup substance toward separation tank 101 in filtering and separating mechanism 10, where absorbing material breakup substance was left and the processing liquid was discharged to a sewage treatment facility side.

(6) Absorbing Material Breakup Substance Recovering Step

After completion of the filtering and separating step, absorbing material breakup substance was compressed to a cake by extending a rod of compression cylinder 63 and moving compression plate 64 forward. Then, after opening opening-closing door 62, the rod of the compression cylinder 63 was further extended to further move compression plate 64 forward to drop and recover the cake in cake recovering container 70.

The recovered cake-like absorbing material breakup substance can be disposed as general waste, because it was thermally sterilized or thermally disinfected. Further, the cover material breakup substance left in rotating drum 7 can also be disposed as general waste after being taken out of rotating drum 7, because it was thermally sterilized or thermally disinfected.

Example 3

Used Paper Diaper Processing Equipment III

[Equipment Configuration]

Figure 9:
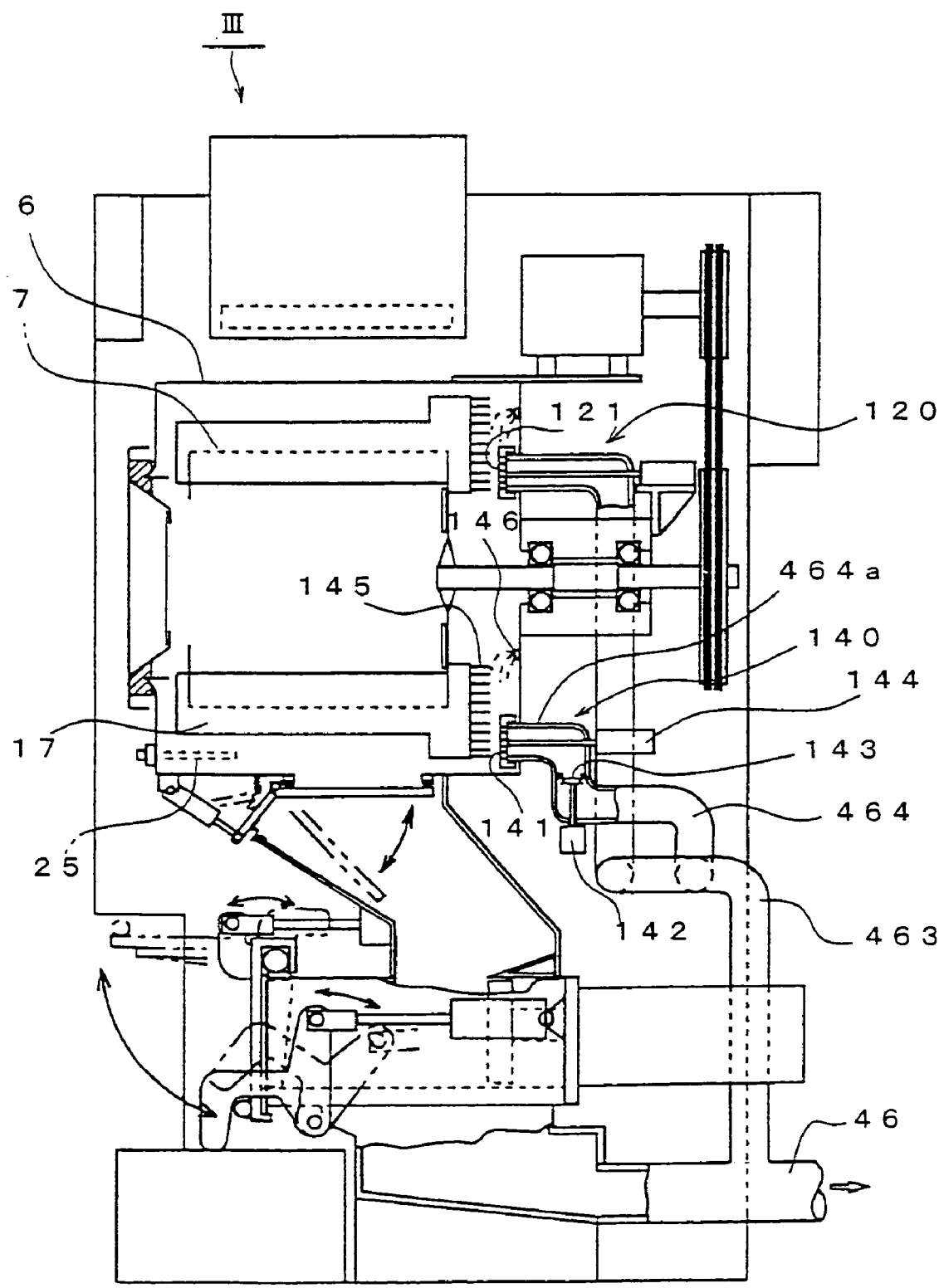
FIG. 9 shows a side cross-sectional view illustrating an inner structure of the used paper diaper processing equipment III in Example 3.

FIG. 9 is a side cross-sectional view explaining the inner structure of a further different type of used paper diaper processing equipment.

As shown in FIG. 9, the paper diaper processing equipment 1 in Example 3 differs from the used paper diaper processing equipment II in Example 2 in that filtering and discharging means 140 is arranged at the lower rear part of an outer barrel 6.

Specifically, in this filtering and discharging means 140, first branch pipe 463 having the above-described overflow liquid discharging means 120 is connected as a branch to main drain pipe 46, which is extending to a sewage treatment facility, and upper stream end 464a of second branch pipe 464, which is connected to this first branch pipe 463, is installed from a lower rear part of outer barrel 6 toward the inside, and at its opening port (liquid discharging port), mesh filter made of metal and the like is mounted as filtering material 141 for filtering and removing absorbing material breakup substance dispersed in the processing liquid, and discharging the processing liquid containing excreta down to a sewage treatment facility side via second branch pipe 464, first branch pipe 463 and main drain pipe 46. In the vicinity of an upper stream end of second branch pipe 464, opening-closing valve 143 is installed which is opened or closed by forward/backward driving means 142 such as a cylinder and the like.

Further, brush 145 is installed at an opposing position to filtering and discharging means 140 in stirring protrusions 17 provided on the outer surface (rear surface) of rotating drum 7, that is, at the rear end part of stirring protrusions 17, for scraping off and removing cake on filtering material 141 mounted at filtering and discharging means 140. On the other hand, filtering and discharging means 140 has forward/backward driving means 144 such as a cylinder and the like for moving forward or backward the filtering material 141 toward this brush 145 and spraying means 146 for promoting prevention of clogging of the filtering material 141 by spraying water toward filtering material 141 and brush 145.

In the present embodiment, electric heater 25 is arranged as a heating means for processing liquid at the lower front part of outer barrel 6, because filtering and discharging means 140 is installed at lower rear part of outer barrel 6.

[Processing Method]

Figure 10:
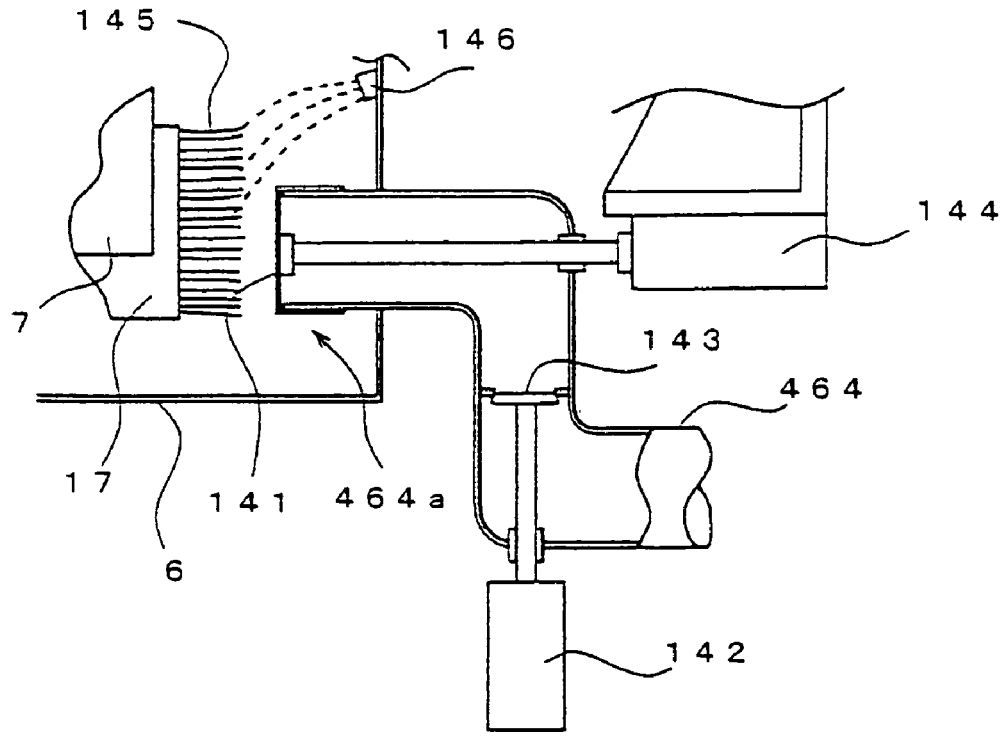
FIG. 10 shows a filtering and discharging means of the used paper diaper processing equipment III in Example 3, and (a) is a side cross-sectional view of the main part thereof in a usual state in service and (b) is a side cross-sectional view of the main part thereof in a clogging removing state.
Figure 10:
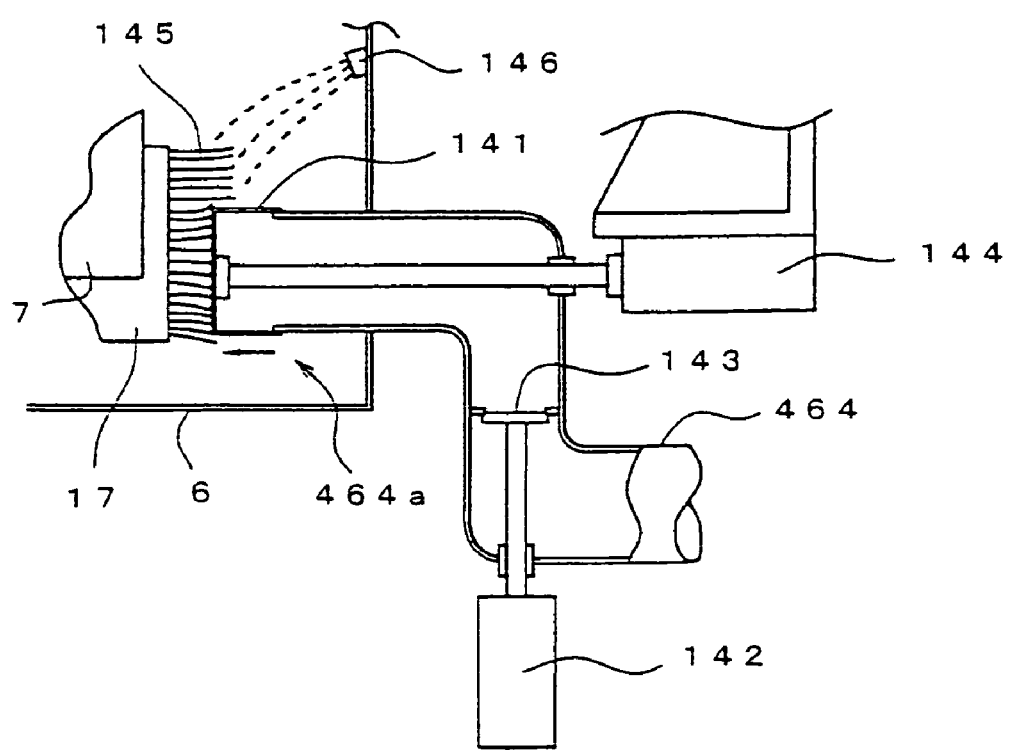

In the paper diaper processing equipment III in Example 3, as shown in FIG. 10, opening-closing valve 143 is released open by forward/backward driving means 142 in filtering and discharging means 140 installed at lower rear part of outer barrel 6, in the above-described liquid discharging step, and absorbing material breakup substance dispersed in the processing liquid is filtered and removed by filtering material 141 installed at upper stream end 464a of second branch pipe 464, and processing liquid containing excreta is discharged into a sewage treatment facility side via second branch pipe 464, first branch pipe 463 and main drain pipe 46.

Further, even when cake such as cellulose and the like adheres to filtering material 141 installed at this liquid discharging means 140, the cake can be scraped off and removed, as shown in FIG. 10 (*b*), by brush 145, attached at stirring protrusions 17 provided on the outer surface of rotating drum 7, by moving forward filtering material 141 toward brush 145 with forward/backward driving means 144 during rotation of rotating drum 7, and by repeated contact of the brush 145 with filtering material 141 by rotational force of rotating drum 7. In this case, spraying means 146, installed in the vicinity of filtering and discharging means 140, sprayed water toward filtering material 141 and brush 145 to promote prevention of clogging of filtering material 141. Thus, cellulose and the like adhered to filtering material 141 can be released and floated in processing liquid in outer barrel 6. Therefore, adhesion of cellulose and the like in block to filtering material 141 can be prevented.

Also, after completion of the above-described rinsing step, the liquid discharging step is performed again by releasing opening-closing valve 143 of filtering and discharging means 140 for discharging processing liquid together with excreta in outer barrel 6 into a sewage treatment facility side. In this case, similarly as in the above-described liquid discharging step, clogging by cellulose and the like can be prevented by repeated contact of brush 145 with the surface of filtering material 141. When a lowered liquid level is detected by third liquid level detector 38c, opening-closing valve 143 is closed and discharging is stopped to leave enough volume of processing liquid for enabling the cellulose and the polymer with high water absorbability to be floated in outer barrel 6.

As shown above, the paper diaper processing equipment III in Example 3 fundamentally exerts operational effects similar to the paper diaper processing equipment II in Example 2, but in the paper diaper processing equipment III of the present Example, in particular, filtering and discharging means 140 is arranged on a rotational locus of rear end part of stirring protrusions 17 at rear part of rotating drum 7, similarly to the above-described liquid discharging means 120, and thus when brush 145 is mounted at the rear end part, brush 145 of said filtering and discharging means 140 can be utilized also as a brush for scraping off cake on filtering material 121 of the above-described overflow liquid discharging means 120, and furthermore, contributing to simplification of piping around discharging system.

In the present embodiment, lowered liquid level is detected by third liquid level detector 38c, and enough volume of processing liquid for floating the cellulose and the polymer with high water absorbability is left in outer barrel 6, but such composition may also be possible as the required volume of processing liquid is left by positioning of the discharging port. That is, the filtering and discharging means may have a liquid discharging port at position for discharging processing liquid in outer barrel 6 into a sewage treatment facility side while leaving processing liquid in an amount sufficient for cellulose and a polymer with high water absorbability in outer barrel 6 to be floated in the processing liquid. In this occasion, prevention of precipitation can be further ensured by installing stirring protrusions (not shown in Fig.) for stirring processing liquid left in lower position than discharging port and floating a cellulose and a polymer with high water absorbability left in outer barrel 6, on the outer surface (or outer circumferential surface, front or rear surface, or tip of stirring protrusions) of rotating drum 7.

Example 4

Used Paper Diaper Processing Equipment IV

Figure 11:
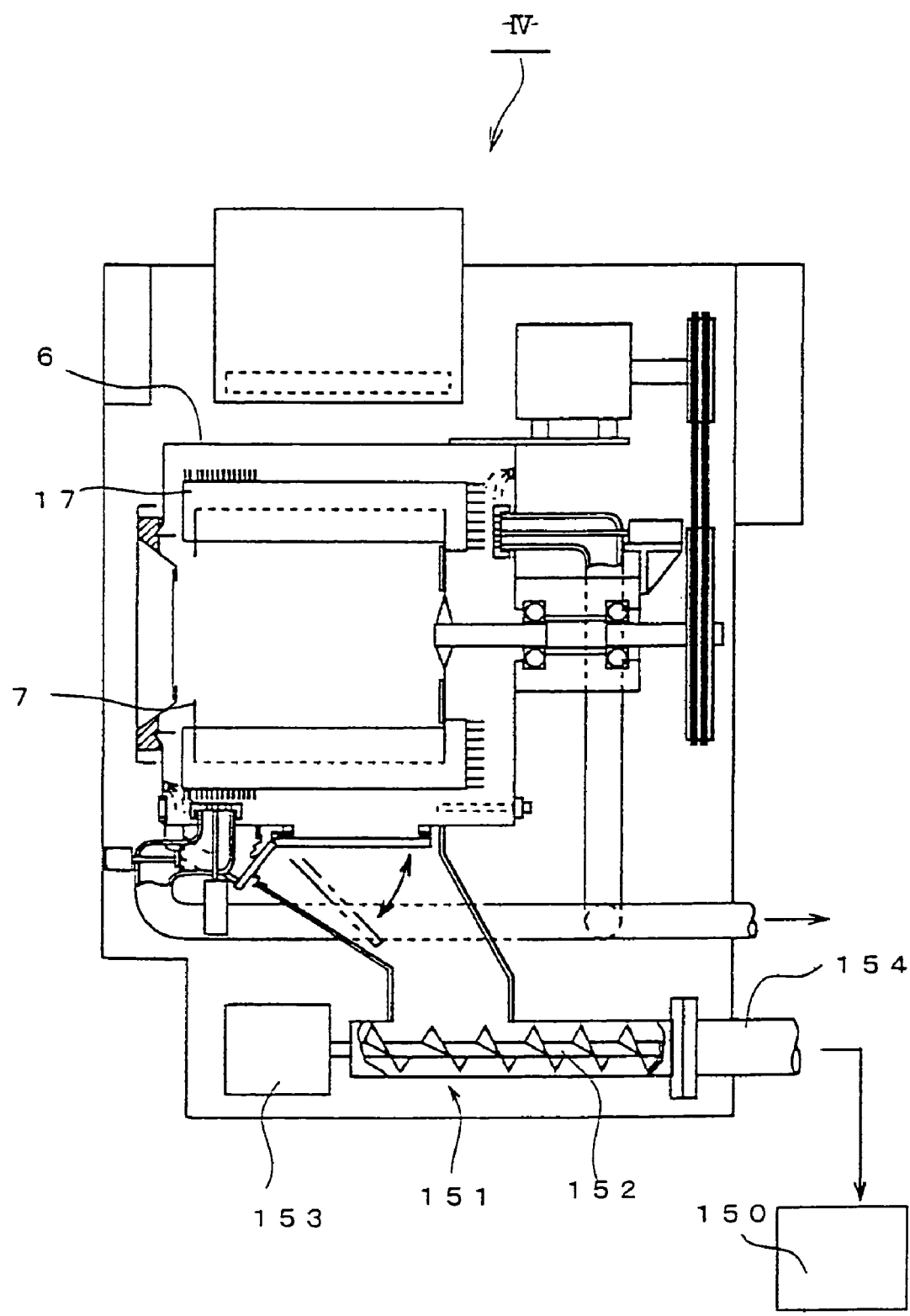
FIG. 11 shows a side cross-sectional view illustrating an inner structure of the used paper diaper processing equipment IV in Example 4.

FIG. 11 shows an inner structure of the paper diaper processing equipment IV as the fourth embodiment.

As shown in FIG. 11, the paper diaper processing equipment IV of the present Example differs from the used paper diaper processing equipment in the above-described Examples 2 and 3 in that filtering and separating mechanism 150 is installed apart from housing 3 instead of filtering and separating mechanism 10 in housing 3, and the transporting exit of continuous transporting means 151 is connected to filtering and separating mechanism 150 by connecting entrance of this continuous transporting means 151 to lower part of the above-described discharging means 130. Specifically, this continuous transporting means 151 is composed of screw conveyer 152, motor 153 for driving said screw conveyer 152 and discharging pipe 154 connected to the above-described screw conveyer 152 at downstream side. Processed substances are transported by screw conveyer 152 to filtering and separating mechanism 150, followed by compression to form cake and dewatering.

Therefore, discharging pipe 154 of this continuous transporting means 151 is composed as an independent system from a discharging pipeline of the above-described filtering and discharging means 110 and the above-described overflow liquid discharging means 120.

In the present embodiment, screw conveyor 152 is employed as continuous transporting means 151, but it is not limited to this type of means, and, for example, belt conveyor may be employed.

The paper diaper processing equipment IV of Example 4 fundamentally exerts operation effects similar to the paper diaper processing equipment I-III of the above-described embodiment, but the paper diaper processing equipment IV of the present Example, in particular, enables to provide compact sizing, in particular, in a vertical direction, because the transporting means is installed between the discharging means and the filtering and separating mechanism, and the filtering and separating means is installed outside of the housing, and thus the original space for the above-described filtering and separating mechanism 10 can be saved.

Example 5

Used Paper Diaper Processing Equipment V

Figure 12:
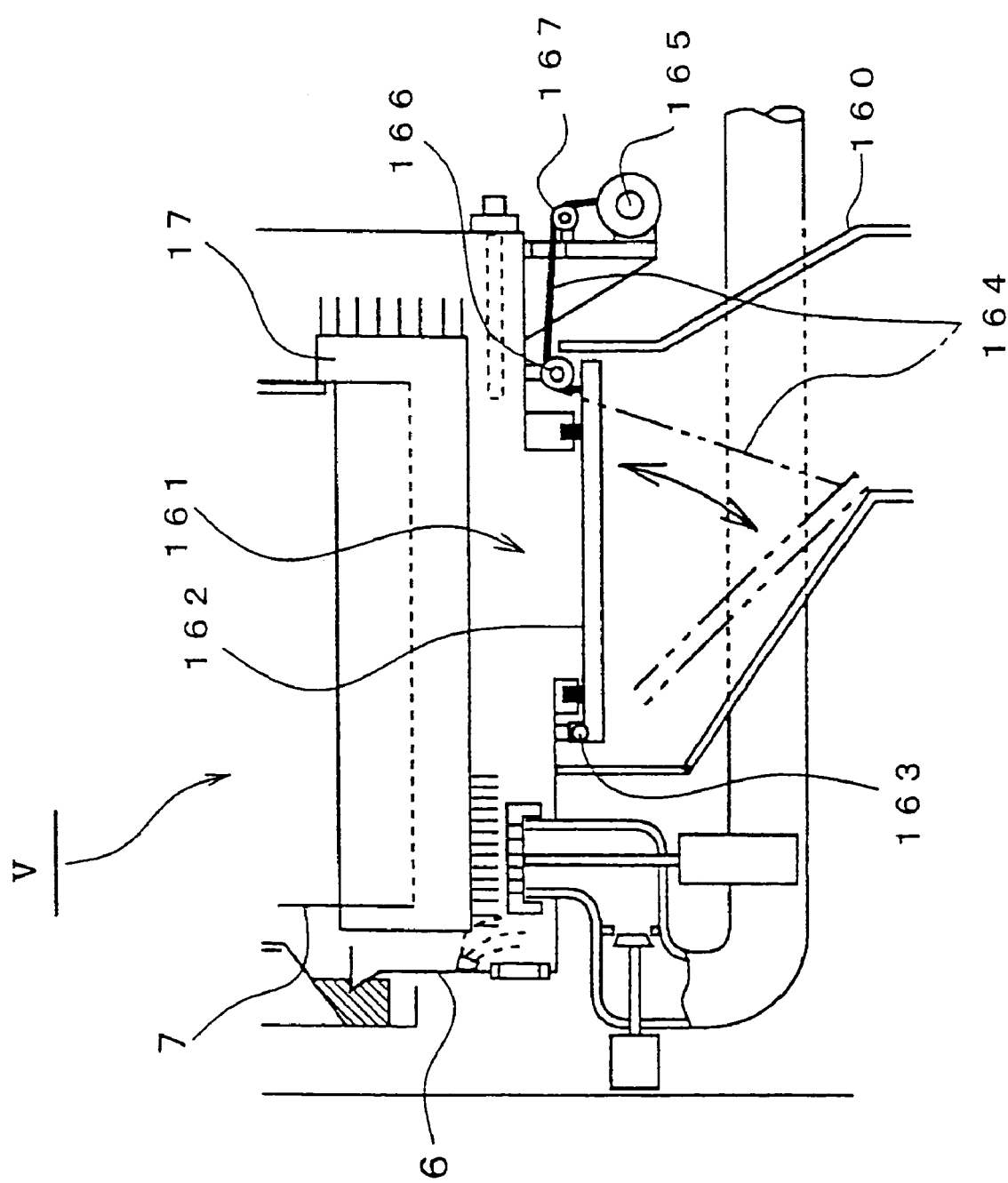
FIG. 12 shows a side cross-sectional view of the main part thereof illustrating an inner structure of the used paper diaper processing equipment V in Example 5.

FIG. 12 is also a cross-sectional side view of the main parts showing an inner structure of the paper diaper processing equipment V.

As shown in the Fig., the paper diaper processing equipment V differs from the paper diaper processing equipment II of Example 2 in the opening-closing mechanism of discharging means 160 for opening and closing a part of the bottom part of outer barrel 6 and for discharging contents of the outer barrel 6 to the above-described filtering and separating mechanism 10.

Specifically, in discharging means 160 of Example 5, an opening-closing door 162 for opening and closing opening section 161 formed at the bottom of outer barrel 6 is formed by a rectangular flat plate, wherein, at one side thereof, pivoting shaft 163 is provided, and wire-like member 164 such as wire, chain and the like is connected to the opposing side, and the wire-like member 164 is wound or unwound by winding means 165 via pulleys 166 and 167 for opening and closing the above-described opening-closing door 162.

The used paper diaper processing equipment V of the present Example fundamentally exerts the effects similar to those by the used paper diaper processing equipment I-IV of the above-described Examples, but the used paper diaper processing equipment V of the present Example can easily respond to even heavier materials to be processed by using a large capacity of driving equipment for winding means 165, because opening-closing door 162 for opening and closing opening section 161 at the bottom part of outer barrel 6 is operated by winding or unwinding of wire-like member 164.

INDUSTRIAL APPLICABILITY

As described above, the present invention can provide a convenient used paper diaper processing equipment which can suppress increase in volume in used paper diaper processing, breaking up an inner polymer with high water absorbability or a cellulose in pieces without finely cutting covers in the breakup step, reduce excreta remained in a recovered cellulose and polymer with water absorbability, and further prevent clogging by excreta, and thus provide compact sizing compared to processing performance and relatively free selection of installation space.

Namely, swelling by moisture absorption during processing can be prevented because a used paper diaper is immersed in an aqueous solution of a swelling suppressant to suppress swelling of a polymer with high water absorbability, and thus the quantity of paper diapers per one cycle of processing can be increased. Therefore, more compact sizing and saving of installation space can be attained compared with the conventional processing equipment, with the same processing capacity. This effect enables installation at hospitals, nursing homes for the aged and hotels having limited floor space.

Furthermore, in the used paper diaper processing method of the present invention, jointed parts of cover materials are easily delaminated, because the used paper diaper is contained in a rotating drum and broken up during rotation under a heated condition. Therefore, it is not required to cut down cover materials more finely than required, and can suppress commingling of their fractures in powders of recovered absorbing material breakup substance, and can be recovered separately from absorbing material by leaving it in the rotating drum.

Furthermore, when the discharging of processing liquid is stopped in the course of the discharging step, absorbing material breakup substance left can be maintained in a floating state in undischarged processing liquid, and thus a cellulose and a polymer with high water absorbability can flow out together with processing liquid, when processing liquid is added afterward or flowed down to a filtering and separating tank. It therefore makes handling easy in steps subsequent to the discharging step.

Further, compression of a cellulose and a polymer with high water absorbability remained after filtering and separating provides reduction of not only in volume but also in content of the processing liquid, which makes handling easy in the subsequent steps.

In addition to this, since there is sufficient specified clearance between an outer barrel and a rotating drum, and between an outer barrel and stirring protrusions provided on the outer circumferential surface of the outer barrel, a trouble that swollen polymer with high water absorbability blocks between a rotating drum and an outer barrel to stop rotation of the rotating drum can be solved.

Furthermore, since a processing liquid stored at a lower part of the outer barrel is stirred by stirring protrusions provided on the outer surface of the rotating drum, the absorbing material breakup substance can be positively dispersed and floated after coming out of the rotating drum, and thus a trouble of precipitation in block can be solved. In particular, this is remarkably effective for a cellulose fiber used as an absorbing material.

What is claimed is:

1. A used paper diaper processing method for breaking up a used paper diaper composed of at least cover materials consisting of a water-impermeable sheet and a water permeable non-woven fabric, and absorbing materials containing a fiber material and a polymer having high water absorbability, the method comprising:

charging a used paper diaper into a rotating drum having a cylinder-like shape and being contained within an outer barrel, the rotating drum having a plurality of through holes on a circumferential wall of the rotating drum, and having stirring protrusions for stirring a processing liquid, the stirring protrusions being provided at an inner surface of the circumferential wall of the rotating drum;

immersing the used paper diaper in a swell suppressant solution to suppress the swelling of the polymer having high water absorbability;

breaking up the used paper diaper after said charging of the diaper into the rotating drum and said immersing of the diaper in a swell suppressant, wherein said breaking up of the used paper diaper includes immersing the used paper diaper in the processing liquid at a temperature not lower than 80° C., and stirring the processing liquid with the stirring protrusions as the rotating drum is rotated in one direction such that the used paper diaper is broken up into a cover material breakup substance and an absorbing material breakup substance by an impact caused by the rotation of the rotating drum, the impact including at least an impact from the diaper falling after being lifted up by the stirring protrusions;

removing the cover material breakup substance by passing the processing liquid, excreta from the diaper and the absorbing material breakup substance through the through holes of the rotating drum such that the cover material breakup substance remains in the rotating drum;

adjusting a liquid level of the processing liquid in a processing room having a discharge port and a first filtering material by discharging an amount of the processing liquid and excreta from the discharge port through the first filtering material to a sewage treatment facility, wherein the processing room comprises (a) an interior of the outer barrel or (b) the interior of the outer barrel and a receiving tank provided continuously beneath the outer barrel, and wherein the amount of the processing liquid that is discharged is such that an amount of the processing liquid which remains in the processing room is sufficient so as to enable the absorbing material breakup substance to remain floating in the processing liquid;

filtering the absorbing material breakup substance and the remaining processing liquid and excreta in the processing room by sending the absorbing material breakup substance and the remaining processing liquid and excreta through a filtering and separating mechanism having a second filtering material, wherein the remaining processing liquid and excreta is discharged through the second filtering material to the sewage treatment facility and the absorbing material breakup substance is separated and removed in the filtering and separating mechanism; and recovering the absorbing material breakup substance separated and removed by the filtering and separating mechanism.

2. The used paper diaper processing method according to claim 1, wherein each of the stirring protrusions is one of a hat-like protrusion having an elliptical cross-section, a plate-like blade, a paddle, or a bar, each of the stirring protrusions having curved surfaces or surfaces connected at obtuse angles, and wherein the stirring protrusions are formed along an axial direction of the rotating drum and are arranged at a plurality of positions, respectively, so as to be spaced apart at equal angles along an inner circumferential direction of the rotating drum.

3. The used paper diaper processing method according to claim 2, wherein the stirring protrusions are arranged at 3-6 positions so as to be spaced apart at equal angles along the inner circumferential direction of the rotating drum.

4. The used paper diaper processing method according to claim 1, wherein said breaking up of the used paper diaper further comprises softening a heat-sealed part of the cover material of the diaper due to the temperature of the processing liquid, and breaking up the cover material into the water-impermeable sheet and the water permeable non-woven fabric by delaminating the softened heat-sealed part by the impact caused by the rotation of the rotating drum such that the absorbing material is released from the diaper and broken up into pieces.

5. The used paper diaper processing method according to claim 1, wherein the swell suppressant is at least one kind of water soluble substance selected from the group consisting of alkali earth metal salts, polyvalent metal salts and metal hydroxides.

6. The used paper diaper processing method according to claim 1, wherein the processing liquid contains at least one kind of chemical agent selected from the group consisting of disinfectants, deodorants, odor adsorbing agents, anti-odor agents, germicides, antimicrobial agents and perfuming agents.

7. The used paper diaper processing method according to claim 1, wherein said adjusting of the liquid level further comprises discharging an amount of the processing liquid and excreta from the discharge port through the first filtering material to a sewage treatment facility such that 20-30% of the processing liquid remains in the processing room.

8. The used paper diaper processing method according to claim 1, further comprising:

feeding fresh processing liquid into the processing room after at least a portion of the processing liquid that contains excreta has been discharged from the processing room such that the cover material breakup substance in the rotating drum is washed by the fresh processing liquid and rotation of the rotating drum.

9. The used paper diaper processing method according to claim 1, further comprising:

feeding fresh processing liquid into the processing room after at least a portion of the processing liquid that contains excreta has been discharged from the processing room through the discharge port and the first filtering material, such that the absorbing material breakup substance in the processing room is washed by the fresh processing liquid and rotation of the rotating drum.

10. The used paper diaper processing method according to claim 1, wherein said recovering of the absorbing material breakup substance further comprises compressing the absorbing material breakup substance remaining from said filtering of the absorbing material breakup substance.

11. The used paper diaper processing method according to claim 1, further comprising:

dewatering the cover material breakup substance that has been separated from the absorbing material breakup substance.

* * * * *